US005677993A

United States Patent [19]

Ohga et al.

[11] Patent Number: 5,677,993
[45] Date of Patent: Oct. 14, 1997

[54] INFORMATION PROCESSING APPARATUS USING POINTING INPUT AND SPEECH INPUT

[75] Inventors: Yukiharu Ohga, Katsuta; Hiroshi Seki, Hitachi; Setsuo Arita, Hitachiota; Koichi Kawaguchi, Hitachi, all of Japan

[73] Assignee: Hitachi, Ltd., Tokyo, Japan

[21] Appl. No.: 113,816

[22] Filed: Aug. 31, 1993

[30] Foreign Application Priority Data

Aug. 31, 1992 [JP] Japan ................................. 4-230851

[51] Int. Cl.$^6$ ........................................................ G10L 3/00
[52] U.S. Cl. ............................................. 395/2.84; 395/2.85
[58] Field of Search ........................... 395/2, 2.4, 2.67, 395/2.79, 2.83–2.85; 381/41, 48, 51; 364/492–495; 376/217, 245, 259

[56] References Cited

U.S. PATENT DOCUMENTS

| 4,060,716 | 11/1977 | Pekrul et al. ........................... 364/576 |
| 4,834,473 | 5/1989 | Keyes, IV et al. ..................... 395/275 |
| 4,957,690 | 9/1990 | Fennern ................................. 364/492 |
| 5,068,080 | 11/1991 | Impink, Jr. et al. ................... 376/217 |
| 5,231,670 | 7/1993 | Goldhor et al. ....................... 395/2.84 |
| 5,258,652 | 11/1993 | Nigawara et al. ..................... 307/38 |
| 5,386,494 | 1/1995 | White ................................... 395/2.84 |

FOREIGN PATENT DOCUMENTS

| 60-146327 | 8/1985 | Japan . |
| 64-41922 | 2/1989 | Japan . |
| 2-39307 | 2/1990 | Japan . |
| 2-186421 | 7/1990 | Japan . |
| 2-207303 | 8/1990 | Japan . |
| 3-179517 | 8/1991 | Japan . |

OTHER PUBLICATIONS

"Case Systems for Natural Language", Bertram Bruce, pp. 327–360, *Artificial Intelligence*, 1975.

"Developing a Natural Language Interface to Complex Data", Gary G. Hendrix et al., vol. 3, No. 2, Jun. 1978, pp. 105–147, *ACM Trans. on Database Systems*.

"Request: A Natural Language Question–Answering System"; W.J. Plath, Jul. 1976, pp. 326–335, *IBM J. Res. Develop*.

"An Intelligent Analyzer and Understander of English"; Yorick Wilks, vol. 18, No. 5 pp. 264–274, May 1975, *Communications of the ACM*.

"Integrated Audio–Graphics User Interface," *IBM Technical Disclosure Bulletin*, 33(11):368–71, Apr. 1991.

Schmandt et al., "Augmenting a Window System with Speech Input," *Computer*, 23(8):50–56, Aug. 1990.

Primary Examiner—Allen R. MacDonald
Assistant Examiner—Patrick N. Edouard
Attorney, Agent, or Firm—Antonelli, Terry, Stout & Kraus, LLP

[57] ABSTRACT

Each character string information obtained based on each information inputted by the CRT touch input device and the speech input device respectively is integrated by the input control unit and the memory. The input information analyzing unit analyses the integrated character string information. The output information generating unit generates presentation information corresponding to the demand information obtained by the analysis and outputs this presentation information to the display device. Since the input information from each input device is converted into character string information and it is integrated together and is then analyzed, input information is not restricted by each input device and each input device can be used in a free combination when information is inputted.

12 Claims, 26 Drawing Sheets

```
 18                19
  #1 "FEEDWATER-SYSTEM SYSYTEM DIAGRAM"
   20     21    22    23       24
   (10    10)  (30    20)   VALVE F001
   (20    50)  (50    70)   FEEDWATER PUMP A
   (20    70)  (50    90)   FEEDWATER PUMP B

#2 "MAIN STEAM-SYSTEM SYSYTEM DIAGRAM"

(20    10)  (40    20)   VALVE M001
   (50    50)  (70    60)   VALVE M002
   (80    70)  (120   90)   MAIN STEAM FLOW RATE
   (200   250) (250   270)  TREND DIAGRAM DISPLAY OK
```

FIG. 6

INPUT SENTENCE : KYUUSUIKEI (FEEDWATER SYSTEM) RYUURYOO (FLOW RATE) TORENDO (TREND) HYOOJI (DISPLAY)。 — 49

⬇

① SYNTACTIC ANALYSIS — 50

• WRITE INPUT SENTENCE IN DIVISION AND ADD MEANING, ETC.

| ANALYZED INPUT SENTENCE : | KYUUSUIKEI (FEEDWATER SYSTEM) | RYUURYOO (FLOW RATE) | TORENDO (TREND) | HYOUJI (DISPLAY) |
|---|---|---|---|---|
| SEMANTIC CATEGORY : | <SYSTEM> | <STATE LEVEL> | | |
| MEANING : | FEEDWATER SYSTEM | FLOW RATE | TREND | DISPLAY |

⬇

② IDENTIFICATION OF CONTENTS OF DEMAND — 51

• FIND A SENTENCE PATTERN INCLUDED IN THE INPUT SENTENCE (MEANING) AND IDENTIFY INPUT DEMAND

SENTENCE PATTERN : "TORENDO (TREND) ? TEIJI (PRESENTATION) + SEYO (DO)"

DEMAND : TREND

⬇

③ ALLOCATION OF WORD TO CASE FRAME — 52

• OBTAIN INFORMATION (CASE VALUE) NECESSARY FOR EXECUTING DEMAND

CASE "KEITOU (SYSTEM)" : KYUUSUIKEI (FEEDWATER SYSTEM)

CASE "JOUTAIRYOO (STATE LEVEL)" : RYUURYOO (FLOW RATE)

⬇

④ OUTPUT PROCESSING DEMAND — 53

• OUTPUT PROCESSING DEMAND BASED ON RESULT OF ANALYSIS

TREND (KYUUSUIKEI (FEEDWATER SYSTEM), RYUURYOO (FLOW RATE))

FIG. 7

```
┌─ GRAMMER ─────────────────────────────────────┐
│ RULE RELATING TO STRUCTURE OF SENTENCE        │ ～54
│                                               │
│ SE(SENTENCE) → S(SENTENCE) END (PERIOD),      │
│  S(SENTENCE) → NP(NOUN PHRASE) S(SENTENCE),   │
│  S(SENTENCE) → V(VERB), ……                    │
└───────────────────────────────────────────────┘
```

```
┌─ LEXICON ─────────────────────────────────────┐
│  TITLE          DISPLAY WORD      MEANING     │ ～55
│        NAME OF CATEGORY   SEMANTIC            │
│        OF PART OF SPEECH  CATEGORY            │
│ KYUUSUIKEI  (N  給水系   <SYSTEM>  FEEDWATER SYSTEM) │
│  SHIMESE    (V  示せ      nil       PRESENT)  │
│  TORENDO    (N  トレンド  nil       TREND)    │
│   HYOUJI    (V  表示      nil       PRESENT)  │
│  RYUURYOO   (N  流量    <state level>  FLOW RATE) │
└───────────────────────────────────────────────┘
```

```
┌─ DEMAND IDENTIFICATION RULE ──────────────────┐
│ RELATIONSHIP BETWEEN SENTENCE                 │ ～56
│     PATTERN AND DEMAND                        │
│ DEMAND : TREND                                │
│ SENTENCE PATTERN :                            │
│       "TORENDO ? TEIJI + SEYO"                │
│       "TORENDO ? ¥WA" ……                      │
│ <SYMBOL>  % : COMPARE ONLY WHEN THERE IS AN   │
│  AUXILIARY PART OF SPEECH, + : CAN BE OMITTED,│
│  ? : DESIRED NUMBER OF WORD, ¥ : COMPARE IN   │
│  SEMANTIC CATEGORY                            │
└───────────────────────────────────────────────┘
```

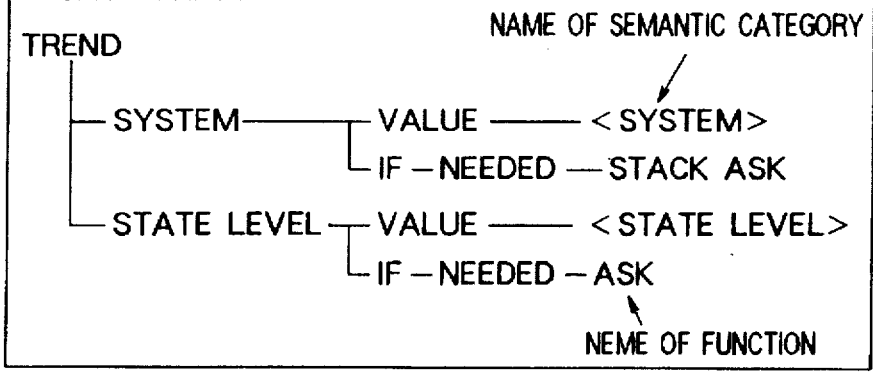

CASE FRAME (57)

FIG. 11

CRT OUTPUT

| SYSTEM NAME | STATE LEVEL | DIAGRAM NUMBER |
|---|---|---|
| FEEDWATER SYSTEM | PRESSURE | TE01 |
| | FLOW RATE | TF02 |
| | ⋮ | ⋮ |
| MAIN STEAM SYSTEM | PRESSURE | TM01 |
| | FLOW RATE | TM02 |
| | ⋮ | ⋮ |
| MAIN STEAM ISOLATION VALVE | OPENING | TMV01 |
| ⋮ | ⋮ | ⋮ |

SPEECH OUTPUT, CRT OUTPUT (CHARACTER OUTPUT STRING)

[KEITOO MEISHOO] [JYOOTAIRYOO MEISHOO] TORENDOZU WO HYOOJI SHIMASU.
([system name] and [state level name] trend diagram is displayed.)

FIG. 16

KNOWLEDGE FOR FEEDWATER-SYSTEM SYSTEM DIAGRAM

| LEFT UPPER POINT | | RIGHT UPPER POINT | | CHARACTER STRING |
|---|---|---|---|---|
| x COORDINATE XL | y COORDINATE YL | x COORDINATE XR | y COORDINATE YR | |
| 10 | 20 | 30 | 10 | VALVE F001 |
| 20 | 70 | 50 | 50 | REACTOR FEEDWATER PUMP A |
| 20 | 90 | 50 | 70 | REACTOR FEEDWATER PUMP B |
| ⋮ | ⋮ | ⋮ | ⋮ | ⋮ |

KNOWLEDGE FOR MAIN-STEAM-SYSTEM SYSTEM DIAGRAM

| 20 | 30 | 40 | 20 | VALVE M001 |
|---|---|---|---|---|
| 50 | 60 | 70 | 50 | VALVE M002 |
| 80 | 90 | 120 | 80 | MAIN STEAM FLOW RATE |
| 200 | 270 | 250 | 250 | TREND GRAPH DISPLAY OK |
| ⋮ | ⋮ | ⋮ | ⋮ | ⋮ |

COMMON KNOWLEDGE

| 10 | 10 | 30 | 0 | OK |
|---|---|---|---|---|
| 50 | 10 | 70 | 0 | NG |
| ⋮ | ⋮ | ⋮ | ⋮ | ⋮ |

FIG. 20

| SYSTEM NAME | TYPE OF OPERATION | NAME OF VARIABLE | SET VALUE |
|---|---|---|---|
| HIGH PRESSURE CORE SPRAY SYSTEM INJECTION VALVE | OPEN | D1 (1) | 1 |
| | AUTOMATIC | D1 (2) | 1 |
| | CLOSE | D1 (3) | 1 |
| HIGH PRESSURE CORE SPRAY SYSTEM PUMP | ON | D1 (4) | 1 |
| | AUTOMATIC | D1 (5) | 1 |
| | OFF | D1 (6) | 1 |
| REACTOR MODE SWITCH | SHUTDOWN | D1 (7) | 1 |
| | REFUEL | D1 (8) | 1 |
| | STARTUP | D1 (9) | 1 |
| | RUN | D1 (10) | 1 |
| ⋮ | ⋮ | ⋮ | ⋮ |

FIG. 22
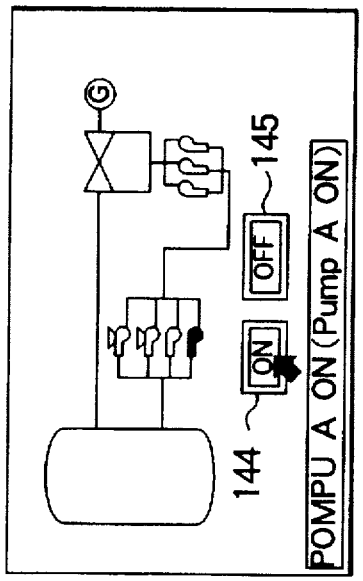
b. TOUCH (ON) OR MAKE SPEECH INPUT
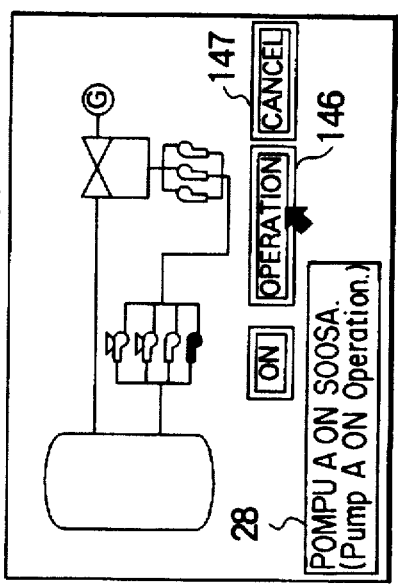
c. TOUCH (OPERATION) OR MAKE SPEECH INPUT
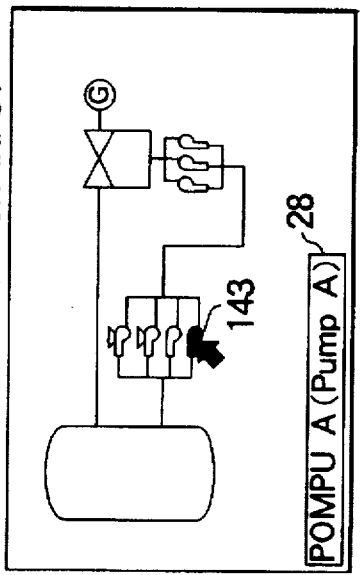
a. TOUCH OBJECT OF OPERATION OR MAKE SPEECH INPUT
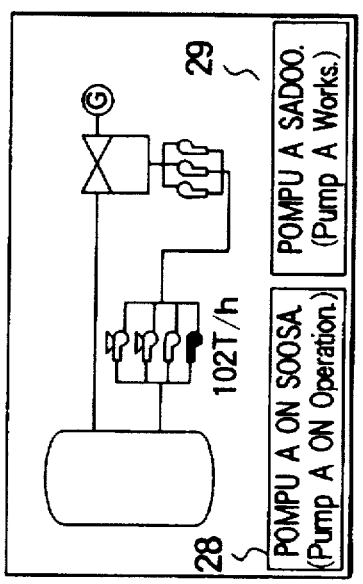
d. DISPLAY RESULT OF OPERATION

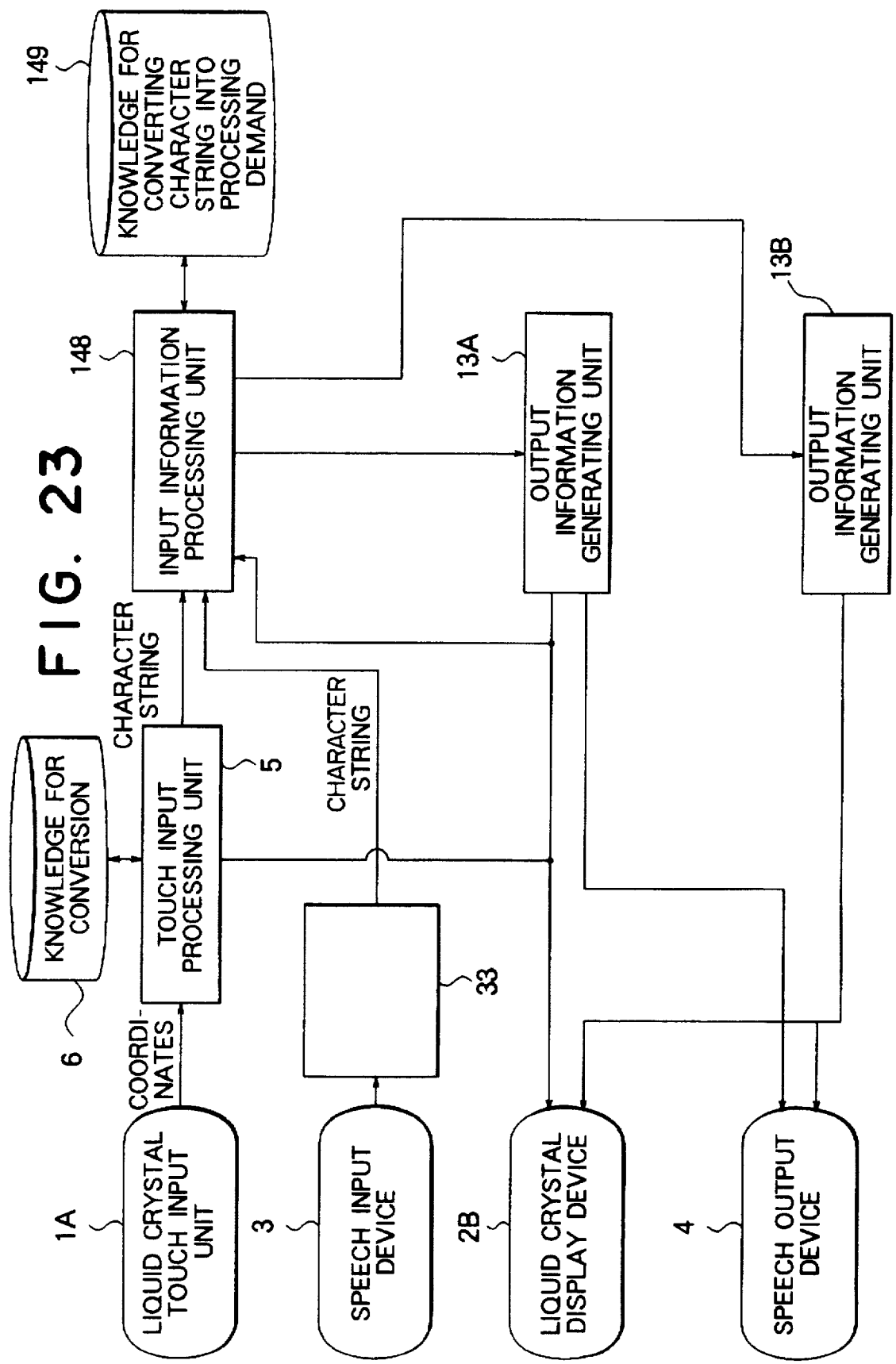

FIG. 24

KNOWLEDGE FOR SYSTEM DIAGRAM 1

| CHARACTER STRING | PROCESSING DEMAND | OUTPUT DESTINATION |
|---|---|---|
| REACTOR FEEDWATER PUMP | display (menu 1) | OUTPUT INFORMATION GENERATING UNIT 13A |
| MAIN STEAM DIVIDER | display (menu 2) | OUTPUT INFORMATION GENERATING UNIT 13A |
| ..... | ..... | ..... |

KNOWLEDGE FOR MENU 1

| CHARACTER STRING | PROCESSING DEMAND | OUTPUT DESTINATION |
|---|---|---|
| VALUE OF REVOLUTION | display (menu 1-1) | OUTPUT INFORMATION GENERATING UNIT 13A |
| ON | display (menu 1-2) | OUTPUT INFORMATION GENERATING UNIT 13A |
| ..... | ..... | ..... |

KNOWLEDGE FOR MENU 1-1

| CHARACTER STRING | PROCESSING DEMAND | OUTPUT DESTINATION |
|---|---|---|
| DISPLAY | display-svar (KYUUSUI POMPU (Reactor Feedwater Pump), KAITENSUU (Revolution Speed)) | INFORMATION GENERATING UNIT 13B |
| TREND DISPLAY | display-trend (KYUUSUI POMPU (Reactor Feedwater Pump), KAITENSUU (Revolution Speed)) | INFORMATION GENERATING UNIT 13B |
| ..... | ..... | ..... |

FIG. 27
a. TOUCH OBJECT OF OPERATION OR MAKE SPEECH INPUT
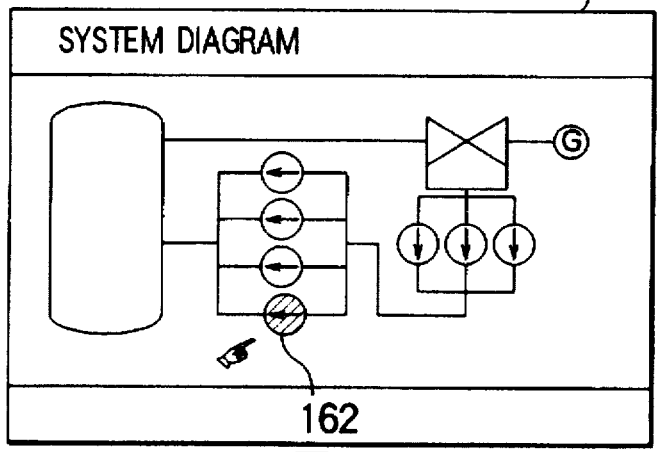
⇩ DISPLAY MENU ON REACTOR FEEDWATER PUMP
b. TOUCH REVOLUTION SPEED OR MAKE SPEECH INPUT
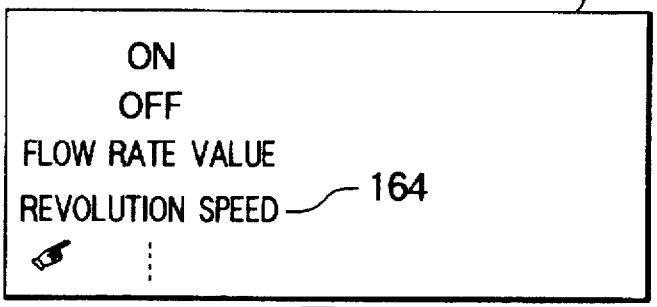
⇩ DISPLAY MENU ON REVOLUTION SPEED
c. TOUCH DISPLAY OR MAKE SPEECH INPUT
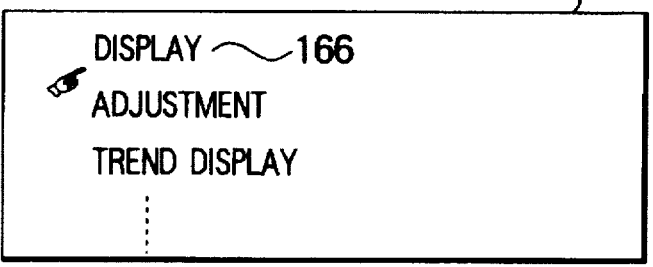
⇩ OUTPUT DEMAND

INFORMATION PROCESSING APPARATUS USING POINTING INPUT AND SPEECH INPUT

BACKGROUND OF THE INVENTION

The present invention relates to an information processing apparatus, and more particularly to an information processing apparatus for producing an output of necessary information such as, for example, display information and control information, in response to information obtained from an input by a pointing input unit such as a CRT touch input and a speech input.

As a conventional technology for inputting a processing demand to a computer by using a touch input unit and a speech input unit, for example, a plant monitoring device as disclosed in the JP-A-2-39307, for example, is known. According to the JP-A-2-39307, a touch screen for detecting coordinates of a point indicated on a display device is fitted to this display device. A touch position detecting device is provided for detecting an indicated plant position based on the coordinates of a touch point obtained on the touch screen and the coordinates of a picture image displayed on the display device.

Further, there are also provided a voice recognizing device for discriminating the name of a process level produced by an operator and a process monitoring computer for advising the operator of data of the process level obtained from the plant based on information of the name of the process level from the voice recognizing device and information of the plant position obtained from a CRT touch input from the touch position detecting device.

According to the example shown in the JP-A-2-39307, it is possible to input demand information to the computer which uses a touch input and a voice input. This technology, however, has a constraint that a plant position must be inputted by a CRT touch and a name of a process level must be inputted by a voice input, so that there is a problem that a name of a process level can not be inputted by a CRT touch and a plant position can not be inputted by voice. Therefore, the operator must recognize in advance the kinds of information which can be inputted by a touch and voice respectively. Thus, a large load is applied to the operator. Particularly when various kinds of processing are going to be carried out, the level of information to be inputted becomes large, and thus applying a constraint to the information input unit means that the load of the operator will increase extremely.

Further, input systems which combine a touch input with a voice input have been disclosed in the JP-A-2-186421 and JP-A-64-41922, for example.

Further, an input system for combining a voice with a mouse/keyboard has been disclosed in the JP-A-60146327. Further, an input system for combining a voice and an eye point of an operator has been disclosed in the JP-A-3-179517.

SUMMARY OF THE INVENTION

It is an object of the present invention to provide an information processing apparatus which can extremely reduce the load of an operator in inputting information in the case of using a pointing input unit and a voice input unit.

In order to achieve the above object, the present invention is characterized in that the information processing apparatus includes an information integrating unit for integrating character string information obtained based on information inputted by a pointing input unit with character string information obtained based on information inputted by a speech input unit, an analyzing unit for analyzing the integrated character string information, and a unit for generating presentation information corresponding to demand information obtained by this analysis and outputting this presentation information to a display device.

The character string refers to a symbol or a symbol string for displaying a word of a natural language or a numeral or the like.

Input information by the pointing input unit and input information by the speech input unit are integrated together by changing these information into character string information which is the information of the same kind. Therefore, there is no limit to the input information due to the pointing input unit and the speech input unit, and the pointing input unit and the speech input unit can be used by freely combining these units together in inputting information. Accordingly, it is possible to extremely reduce the load of the operator in inputting information by using the pointing input unit and the speech input unit.

BRIEF DESCRIPTION OF THE DRAWINGS

FIG. 6 is an explanatory diagram for showing a processing procedure of a process to be carried out by an input information analyzing unit shown in FIG. 1.

FIG. 7 is an explanatory diagram for showing one example of data to be analyzed stored in a memory 10 in FIG. 1.

FIG. 11 is an explanatory diagram for showing one example of knowledge for determining information stored in a memory 12 shown in FIG. 1.

FIG. 16 is an explanatory diagram for showing one example of knowledge for converting coordinates into a character string stored in a memory 6 in FIG. 14.

FIG. 20 is an explanatory diagram for showing one example of knowledge for operation stored in a memory 114 shown in FIG. 14.

FIG. 22 is an explanatory diagram for showing a change of display information in a large-screen display device when a processing relating to the operation of the components has been carried out in the embodiment shown in FIG. 14.

FIG. 23 is a configuration diagram of the information processing apparatus according to another embodiment of the present invention.

FIG. 24 is an explanatory diagram for showing one example of knowledge for converting coordinates into a character string stored in a memory 6 in FIG. 23.

FIG. 27 is an explanatory diagram for schematically showing the operation of the embodiment shown in FIG. 23 when the embodiment shown in FIG. 23 has been carried out.

DESCRIPTION OF THE PREFERRED EMBODIMENTS

Figure 1:
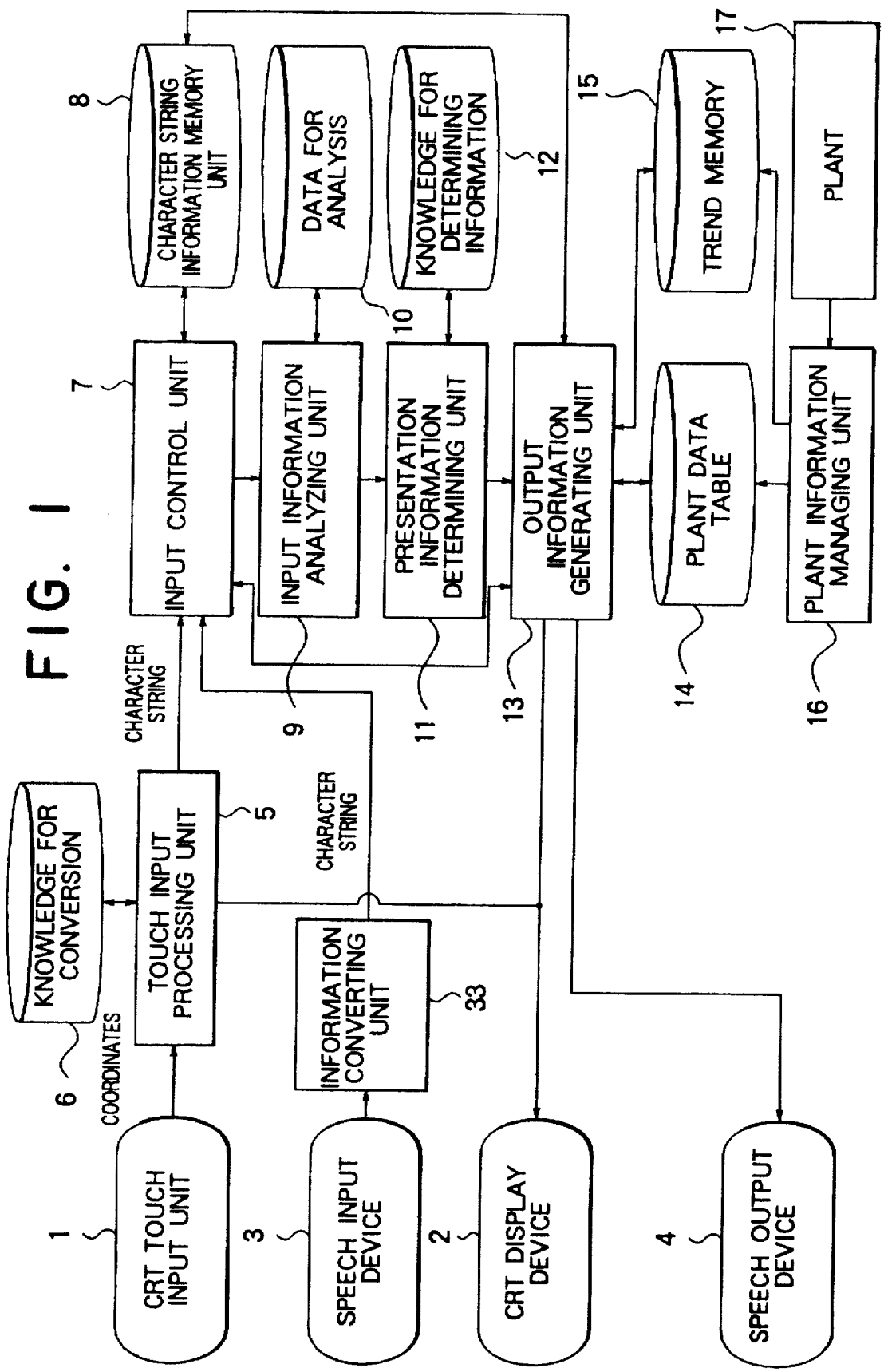
FIG. 1 is a configuration diagram of a plant monitoring apparatus according to one preferred embodiment of the present invention.

Description will now be made of a plant monitoring apparatus, which is one example of the information monitoring apparatus according to a preferred embodiment of the present invention, with reference to FIG. 1. This information monitoring apparatus and a control device to be described later can be said to be information processing apparatuses in broad terms.

The plant monitoring apparatus of the present embodiment has an information input device which includes a CRT touch input device 1, a speech input device 3 for outputting a voice signal from a user (a monitoring person) by converting the voice signal to a character string, a touch input processing unit 5, an input control unit 7, an input information analyzing unit 9, memories 6, 8 and 10, and a speech information converting unit 33. The memory 6 stores knowledge for converting coordinates into a character string which is used by the touch input processing unit 5. The memory 8 is a character string storing unit. The memory 10 stores data for analysis shown in FIG. 7 which is to be described later. The plant monitoring apparatus of the present embodiment further includes a presentation information determining unit 11, a memory 12 for storing knowledge for determining information, an output information generating unit 13, a CRT display device 2, a speech output device 4, a plant data table 14 as a memory, a trend memory 15 and a plant information managing unit 16.

The CRT touch input device 1 is integrated with the CRT display device 2. The plant information managing unit 16 periodically reads data for showing a state of the plant 17 which has been measured by a plurality of measuring units provided in the plant. The plant information managing unit 16 stores trend data such as the temperature, pressure, flow rate of the plant, etc. in the trend data memory 15 and stores data of opening and closing of valves, starting and stopping of components, etc. in the plant data table 14. When an input measured value has exceeded a predetermined value, the plant information managing unit 16 produces alarm information relating to the measured value and stores this alarm information in the plant data table 14.

According to the plant monitoring apparatus of the present embodiment, touch input coordinates from the CRT touch input device 1 are converted into a character string by the touch input processing unit, by using the knowledge for converting coordinates into a character string within the memory 6, and stores the information of this character string in the memory 8 by the input control unit 7. In the mean time, speech information that has been outputted from the speech input device 3 is converted into corresponding character string information by the speech information converting unit 33. The information of the character string outputted from the speech information converting unit 33 is also stored in the memory 8 by the input control unit 7. When a decision has been made that the inputting of the character string information was finished, the input control unit 7 sends the character string information stored in the memory 8 to the input information analyzing unit 9. The information analyzing portion 9 analyzes the inputted character string information by using the data for analysis within the memory 10. The presentation information determining unit 11 determines the information to be presented based on the processing demand obtained by the analysis of the character string information. Then, the output information generating unit 13 outputs the data of the plant corresponding to this presentation information to the CRT display device 2 and the speech output device 4.

Figures 2, 3:
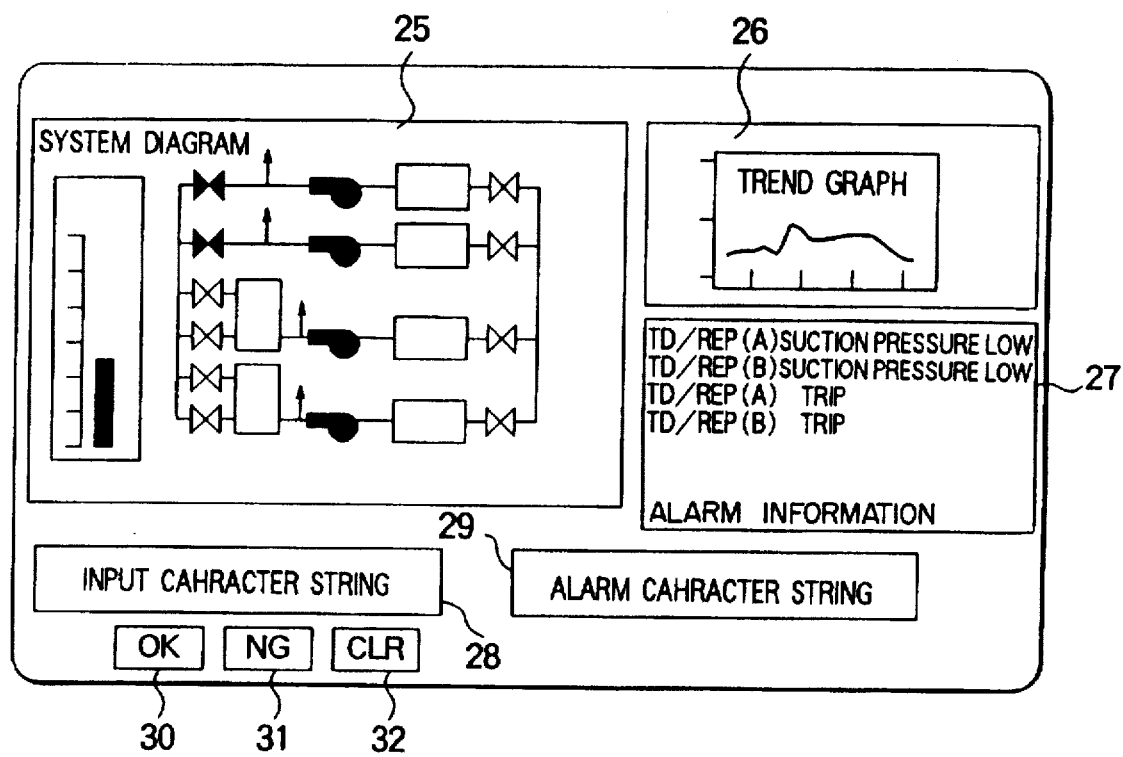
FIG. 2 is an explanatory diagram for showing one example of a display screen of the CRT display device in FIG. 1.
FIG. 3 is an explanatory diagram for showing one example of knowledge for converting coordinates into a character string stored in a memory 6 in FIG. 1.

FIG. 2 shows an example of the display information displayed in the CRT display device 2. 25 designates a display area for displaying a system diagram, 26 a display area for displaying a trend graph, 27 a message display area for displaying a generated alarm or the like, 28 an input character string display area for displaying the character string information stored in the memory 8, 29 a display area for displaying the output character string, and 30 to 32 areas for inputting control character strings "OK", "NG" and "CLR" that are used in the processing of the input control unit 7, respectively. Information to be displayed in the areas 25 to 29 varies corresponding to the character string information based on the input applied by the user. The areas 30 to 32 are the areas of fixed images and display is made at the same position on the screen regardless of the contents of the display of the areas 25 to 29. The user can confirm the contents he (or she) made by himself (or herself) by looking at the character string displayed in the display area 28 of the input character string. If the contents of the display are not correct, it is possible to correct the contents immediately by re-inputting correct data from the areas 30 to 32.

Processing at each unit mentioned above will be explained in detail.

FIG. 3 shows one example of the knowledge for converting coordinates into a character string stored in the memory 6. 18 designates a diagram number of a system diagram displayed in the system diagram display area 25 of the CRT display device 2. 19 designates a name of the system of this system diagram. The diagram number 18 and the name 19 are not used for the processing of converting the character strings but are given to facilitate the understanding of the user when editing the knowledge for converting coordinates into a character string. 20 to 23 designate coordinate values on the screen for designating a square area corresponding to the components included in the system diagram. The coordinate values 20 and 21 show the x and y coordinates of a left down point of the square area and the coordinate values 22 and 23 show the x and y coordinates of a right up point of the square area. 24 designates character string information, and this information is outputted when the coordinates within the square area, assigned by the coordinate values 20 to 23 by the user by using the CRT touch input device, has been inputted. A plurality of square areas prescribed in the knowledge for converting coordinates into a character string are touch areas specified on the screen of the CRT display device 2. By making a touch on this screen, coordinates can be inputted as described later.

Figure 4:
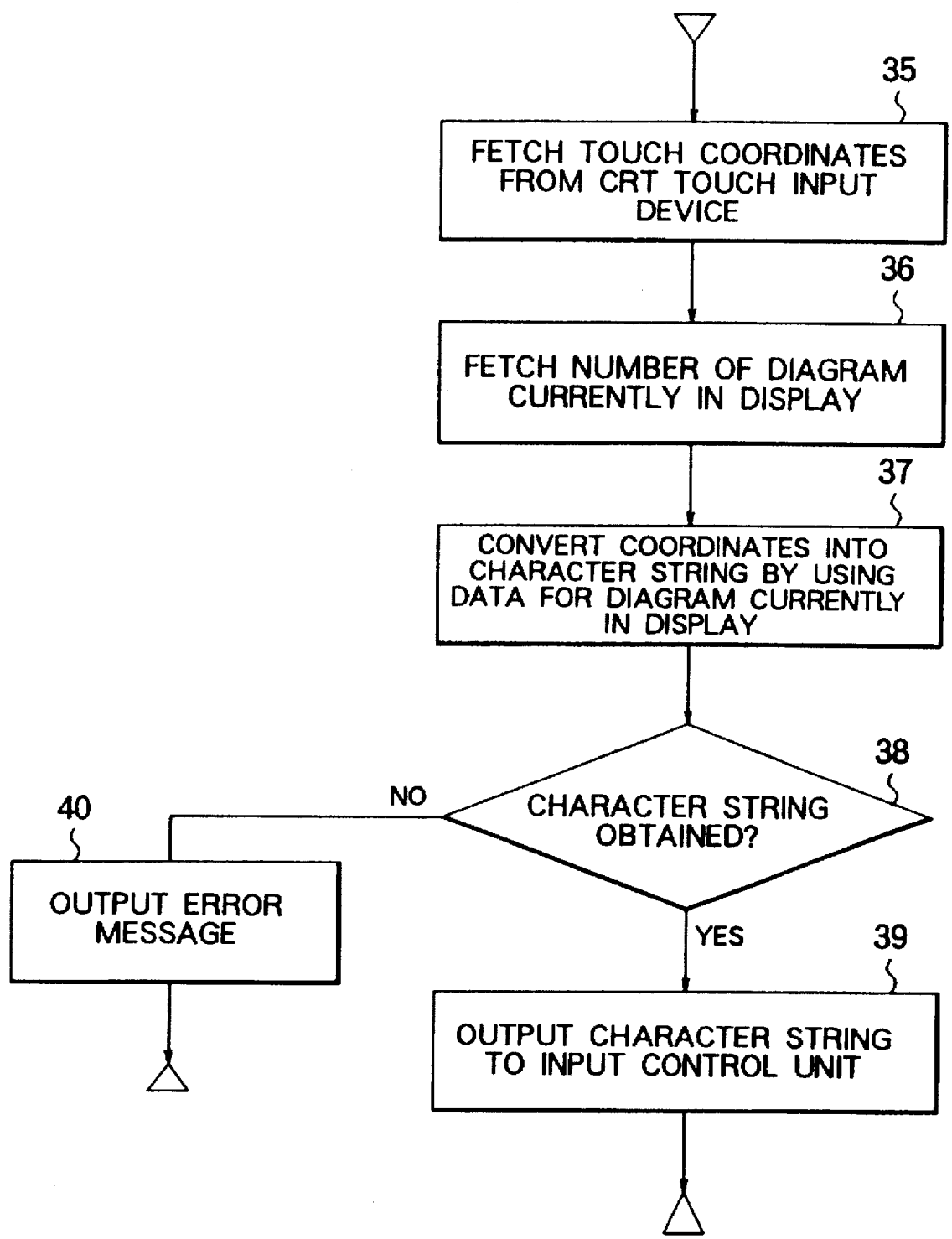
FIG. 4 is an explanatory diagram for showing a processing procedure of a process to be carried out by a touch input processing unit shown in FIG. 1.

The processing at the touch input processing unit 5 will be explained in detail with reference to FIG. 4. At first, the coordinates inputted from the CRT touch input device 1 by a touching by the user is read (Step 35). A diagram number of the system diagram which is currently being displayed in the CRT display device 2 is read from the output information generating unit 13 (Step 36). Next, by using this diagram number, data of the corresponding system diagram is selected from the knowledge for converting coordinates into a character string, and a decision is made sequentially whether the coordinates inputted by the touch enters a square area that has been specified by the coordinates of the knowledge for converting the coordinates into a character string relating to the system diagram that has been selected. If there is a square area in which the touch input coordinates enter as a result of the sequential decision, these touch input coordinates are converted into corresponding character string information 24 (Step 37). If the character string information has been obtained, the decision at the Step 38 becomes "Yes" and the character string information obtained at the Step 39 is outputted to the input control unit 7. If the character string information has not been obtained, an error message of "The touch input is invalid." is outputted to at least one of the CRT display device 2 and the speech output device 4 through the output information generating unit 13 at Step 40. As a result, the user can know whether the touch input has been carried out normally or not.

Figure 5:
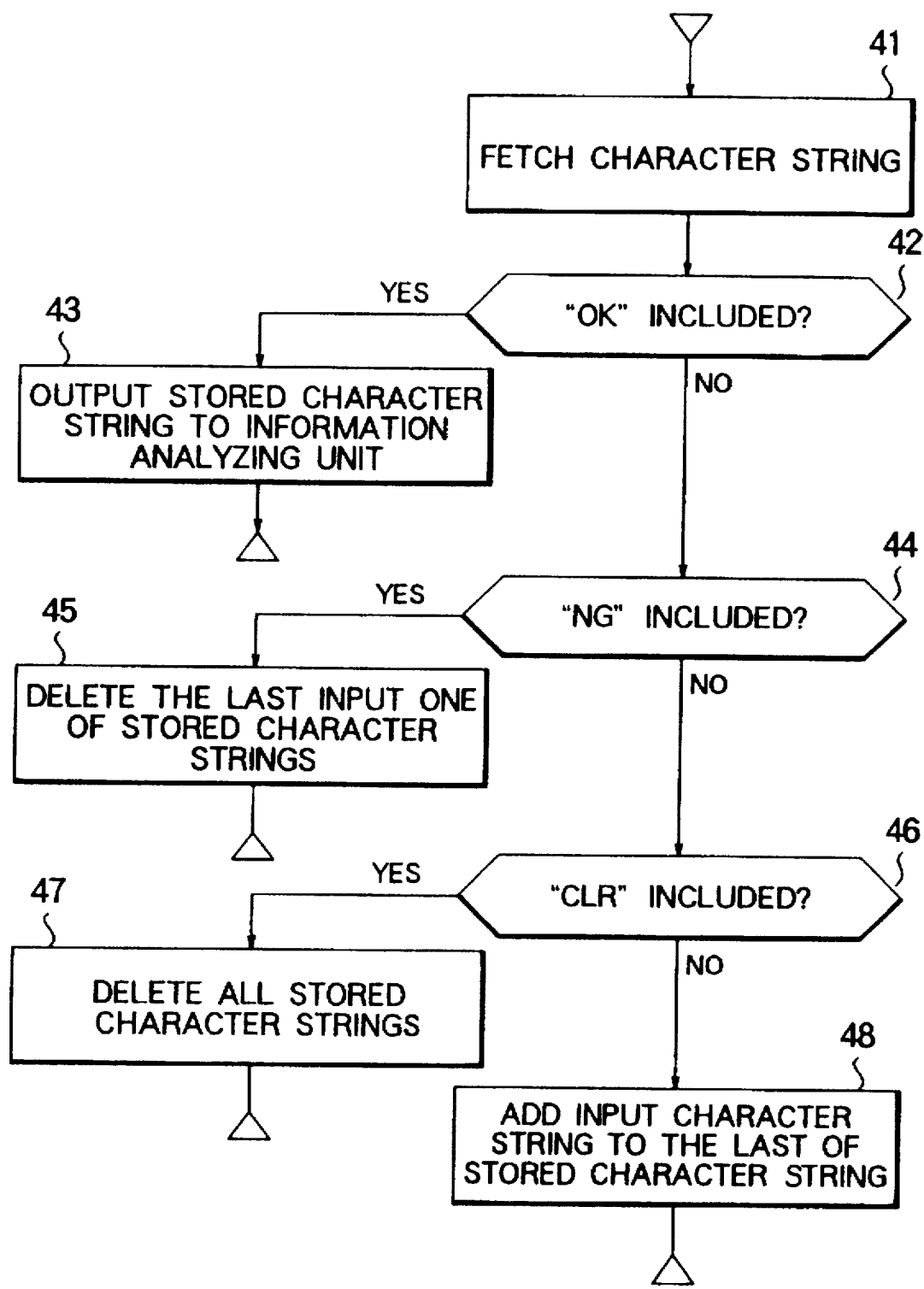
FIG. 5 is an explanatory diagram for showing a processing procedure of a process to be carried out by an input control unit shown in FIG. 1.

The processing by the input control unit 7 is shown in FIG. 5. The input control unit 7 inputs the character string information outputted from one of the touch input processing unit 5 and the speech input device 3 (Step 41). A decision is made whether the information of the inputted character string includes a control character string "OK" for showing an end of the input (Step 42). If the information of the inputted character string includes the control character string "OK", the latest character string stored in the memory 8 is outputted to the input information analyzing unit 9, by adding "OK" to the last of the latest character string that is being stored in the memory 8 if only the control character string "OK" has been inputted (Step 43).

If the "OK" is not included in the information of the inputted character string, that is, if the decision at the Step 42 is "No", a decision is made whether the inputted character string includes a control character string "NG" or not (Step 44). If the "NG" is included in the information of the inputted character string, the last (or latest) inputted character string out of the character strings stored in the memory 8 is deleted (Step 45). Then, the processing at the Step 41 is carried out again.

If the decision at the Step 44 is "No", a decision is made whether a control character string "CLR" has been inputted or not (Step 46). If the "CLR" has been inputted, all the character strings stored in the memory 8 are deleted (Step 47). Then, the processing at the Step 41 is carried out again.

On the other hand, if the "CLR" has not been inputted, the character string inputted at the Step 41 is added to the last of the character string stored in the memory 8 (Step 48). The "OK" is the control character string for executing the end of the input, the "NG" is the control character string for executing the deletion of the character string that has been inputted last, and the "CLR" is the character string for executing the deletion of all the character strings that have been stored. These control character strings can be inputted from both the CRT touch input device 1 and the speech input device 3.

In the present embodiment, the character strings that have been inputted from the touch input processing unit 5 and the speech input device 3 are being stored integrally. It should be noted, however, that it is also possible to store each character string separately and to input these stored character strings to the input information analyzing unit 9 by integrating these character strings together when the "OK" for the end of the input has been inputted. Further, it is also possible to carry out a similar processing by installing a hardware switch or a software switch for generating a control signal, in place of the control character strings "OK", "NG" and "CLR". By using these control character strings, it is possible to read and delete the inputted character strings easily.

Referring to FIG. 1, the input control unit 7 stores each character string information obtained based on the input information inputted from each of the CRT touch input device 1 and the speech input device 3, in the memory 8 in the sequence of the input without discrimination. In other words, the input control unit 7 handles the information inputted from each of the CRT touch input device 1 and the speech input device 3 as the same kind of information, that is, character string information. Therefore, the input information analyzing unit 9 inputs one kind of information, that is, character string information. Accordingly, the input information analyzing unit 9 can easily analyze the contents of the demand which is meant by the character string information by a syntactic analysis or the like as described later, and the computer which structures the plant monitoring apparatus can easily understand this meaning.

The input control unit 7 and the memory 8 are the character string information integrating units for integrating each character string information obtained based on each information when information has been inputted from the CRT touch input device 1 and the speech input device 3, respectively. The memory 8 also stores the integrated character string information.

Next, the processing of the input information analyzing unit 9 will be explained. The analyzing method used by the input information analyzing unit 9 to be described below is explained in the JP-A-2-207303 and "The Preparatory Paper for the 1988 Autumn Lecture Meeting (Part 1), A38, Development of A Question and Answer System relating to the Operation and Maintenance of A Nuclear Power Plant", Atomic Energy Society of Japan, issued on Sep. 10, 1988.

Steps 49 to 53 shown in FIG. 6 designate the contents of the processing executed by the input information analyzing unit 9. FIG. 7 shows an example of data for analysis that is being stored in each memory area of the memory 10. To be more specific, data relating to grammar 54, lexicon 55, demand identification rule 56 and case frame 57 are being stored in each corresponding storage area within the memory 8. The data of the grammar 54 and the lexicon 55 are used in Step 50, the demand identification rule 56 is used in Step 51 for carrying out identification of the contents of the demand, and the data of the case frame 57 is used in Step 52 for carrying out the allocation of words to each case frame.

The input information analyzing unit 9 analyses the inputted character string information, converts the analyzed information into a processing demand and outputs the result. The processing in the Steps 49 to 53 will be explained below. The character string information is inputted from the memory 8 (Step 49). Now, consider a case where "KYUUSUIKEI (Feedwater System) RYUURYOO (Flow Rate) TORENDO (Trend) HYOOJI (Display)" which implies "KYUUSUIKEI NO RYUURYOO NO TORENDO WO HYOOJI SEYO. (Display the flow rate trend of the feedwater system.)" has been inputted as character string information in Japanese.

At the Step 50, a syntactic analysis of the inputted Japanese character string is carried out. First, the syntactic analysis of the inputted character string information is carried out by referring to the category of the part of speech of the word included in the lexicon 55 and the grammar 54. As a result, the character string information is written in division and a semantic category and meaning are added to each word. As a method for the syntactic analysis, a method usually employed is used, such as a predictive bottom-up method, for example. The grammar 54 is a rule relating to the structure of a sentence. For example, a grammar "S (Sentence)→NP (Noun Phrase) S (Sentence)" shows a rule that the S on the left-hand side can be structured by the NP and S on the right-hand side. The grammar 55 includes four information items, that is, a category of a part of speech, a display word which is a word of the index word converted into Kana Kanji character, a semantic category and a meaning, for each index word. However, an auxiliary part of speech has only two information items, that is, a category of a part of speech and a display word.

A recognition of a word included in a sentence of the inputted character string information can be similarly implemented by using a lexicon according to a method of selecting a longest word which matches the sentence, as is usually employed by a word processor or the like. In this method, a similar analysis can be carried out by using only the lexicon 55 without using the grammar 54.

Next, the processing for identification of the contents of the demand is carried out in the Step 51. In this processing, the result of the syntactic analysis carried out in the Step 50 is fetched, and the contents of the demand held by an input sentence (meaning) which is the result of the syntactic analysis is identified by using the demand identification rule 56. The input sentence (meaning) expresses the meaning of the character string information in a sentence. The demand is, for example, a trend which is a trend display demand of a state variable.

The demand identification rule 56 gives a standard sentence pattern to each demand to identify the demand. In the processing of the demand identification at the Step 51, the sentence pattern included in the input sentence (meaning) obtained in the Step 50 is sequentially tried to be matched with each sentence pattern prescribed in the demand identification rule 56. When there is a demand which matches the sentence pattern, this demand is set as an input demand. In the example of the sentence pattern shown in the Step 51 in FIG. 6, the input sentence matches the sentence pattern of "TORENDO (Trend)? TEIJI (Presentation)+SEYO (Do)" of the "trend" shown in the demand identification rule 56 in FIG. 7, and an identification result that the input demand is the trend is obtained. The demand identification rule 56 has prepared symbols in order to give a sentence pattern. "%" is a symbol for displaying a word to be used for matching only when there is an auxiliary part of speech in the input sentence (meaning). With this symbol, it is possible to match an omission of an auxiliary part of speech which is often observed in a dialog sentence. "+" is a symbol for expressing a word that can be omitted, and this symbol is used to correspond to a "TAIGENDOME" in Japanese language grammar, an omission of a declinable part of speech. "?" is a symbol for expressing a desired number of words, and this symbol facilitates the setting of a sentence pattern. "¥" expresses a matching of a word with a semantic category.

Figure 8:
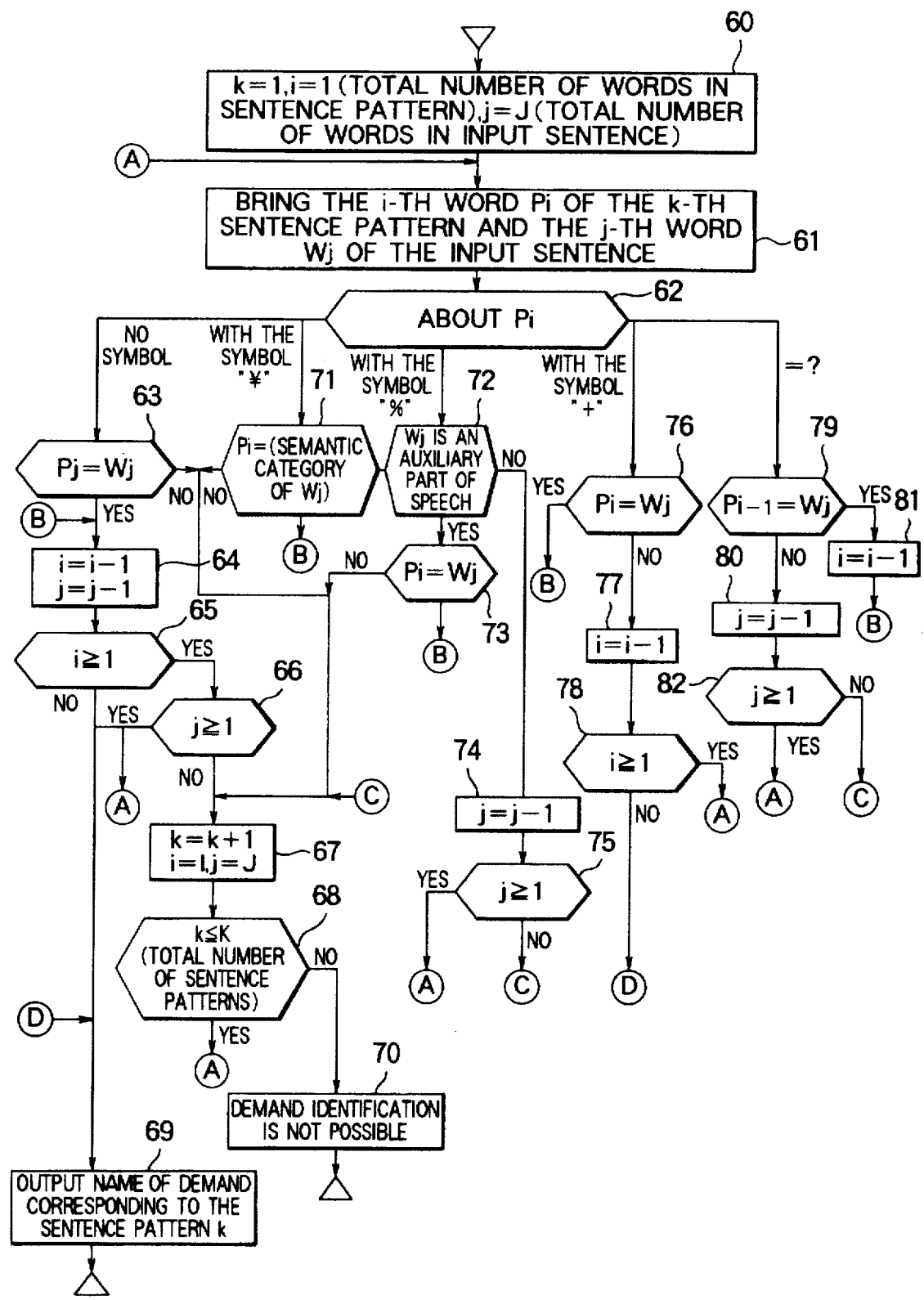
FIG. 8 is an explanatory diagram for showing a detailed processing procedure of Step 51 in FIG. 6.
Figure 9:
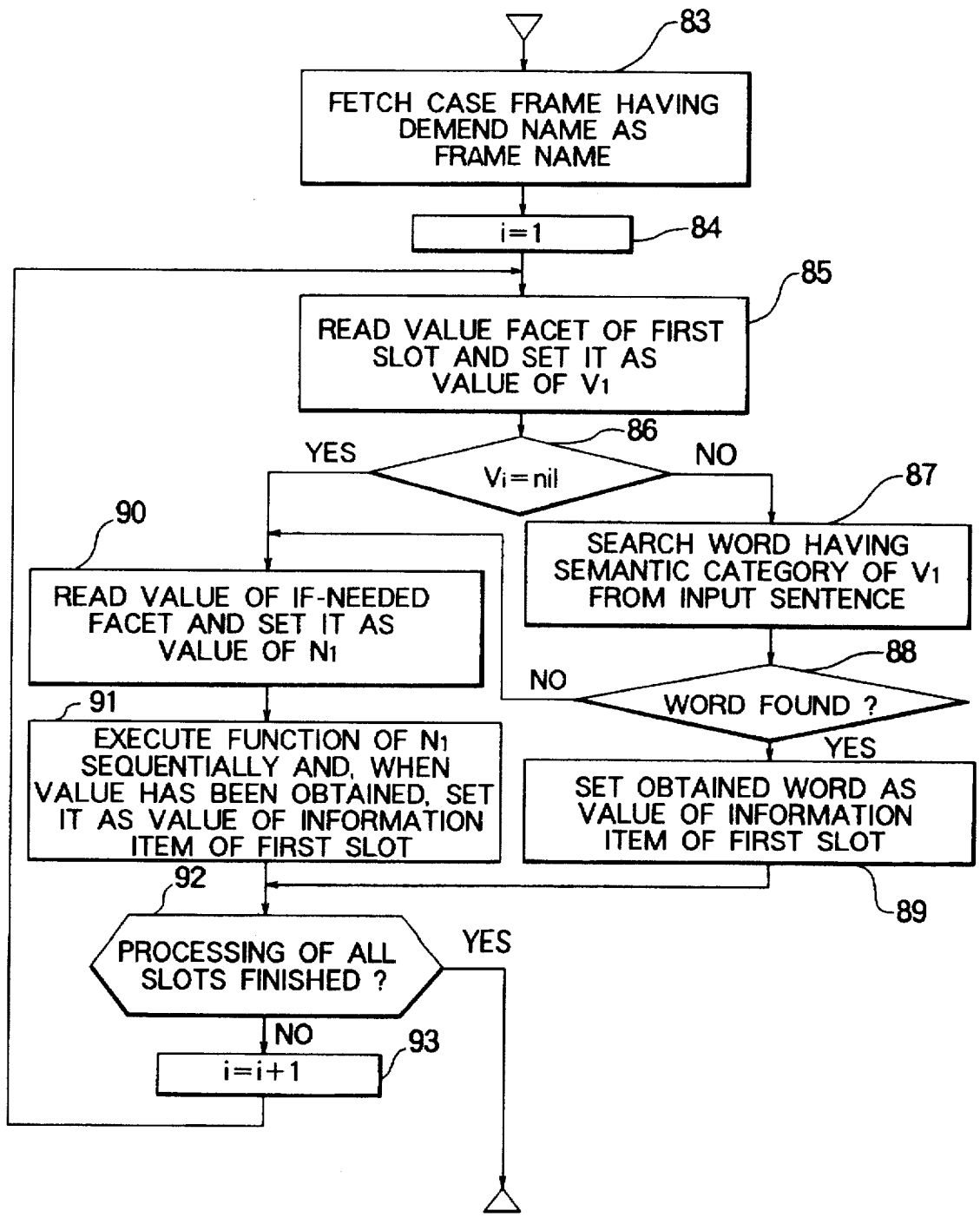
FIG. 9 is an explanatory diagram for showing a detailed processing procedure of Step 52 in FIG. 6.

A detailed processing at the Step 51 which is the demand identification unit will be explained below with reference to FIG. 8. At first, a number k which is a sentence pattern in the demand identification rule 56 is set to 1. Further, for the sentence pattern, i for expressing the number of a word in the sentence pattern is set to a total number I of the words of the sentence pattern. Further, j for expressing the number of a word of the input sentence is set to a total number J of the words of the input sentence (Step 60). Next, an i-th word Pi of a k-th sentence pattern and a j-th word Wj of the input sentence are brought together (Step 61). A matching processing to be described below is carried out for the Pi and Wj. At the beginning, the i has been preset to I and the j has been preset to J, so that the words are to be compared starting from the end towards the head of the input sentence and the sentence pattern respectively.

The matching processing differs depending on the form of the word Pi of the sentence pattern, that is, depending on the presence or absence of the above-described symbols, "+", "?" and "¥" (Step 62). A processing of the case where there is no symbol will be explained first. In this case, Pi is compared with Wj (Step 64). If they are the same, only i and j are subtracted by 1 (Step 64). In other words, the words to be compared are set to one before the current words. If i has become 0 as a result of this (Step 65), all the words of the sentence pattern match the words of the input sentence. In this case, a demand name corresponding to the pattern k is outputted by assuming that this is the contents of the inputted demand (Step 69). On the other hand, if i is 1 or above (Step 65), a decision is made for j (Step 66). If j is 1 or above as a result, the processings from the Step 61 are repeated. If j is 0, on the other hand, the Step 66 gives "No". Since the matching of the sentence pattern k with the input sentence has been unsuccessful, matching with the next sentence pattern (k+1) is prepared (Step 67). If there are still sentence patterns remaining, or if k is not larger than the total number K of the sentence patterns (Step 68), the processings from the Step 61 are carried out for the new sentence patterns. In the mean time, if there is no more remaining sentence pattern, a message that it is not possible to identify the demand is produced and the processing is finished (Step 70).

When the "¥" symbol is fitted to Pi, the semantic category is compared between Pi and Wj (Step 7). Depending on the result of this comparison, the processings of the Step 64 or 67 onward are carried out.

When the "%" symbol is fitted to Pj, a decision is made whether the category of a part of speech of Wj is an auxiliary part of speech or not (Step 72). If the category of a part of speech is an auxiliary part of speech, Pi is compared with Wj (Step 73). Depending on a result of this comparison, the processings of the Step 64 or 67 onward are carried out. If Wj is not an auxiliary part of speech, 1 is deducted from j (Step 74). If a decision has been made at Step 75 that j is 1 or above, the process returns to the Step 61. If j is 0, there is no more word of the input sentence, and processings of the next sentence pattern, that is, the processings from Step 67 onward are carried out by assuming that the matching between the sentence pattern k and the input pattern has been unsuccessful.

If the symbol "+" is attached to Pj, Pj is compared with Wj (Step 76). If they are the same, the processings from the Step 65 are carried out. If Pj is not the same as Wj, 1 is deducted from j (Step 77) and the processing at Step 78 is carried out. If a decision has been made at the Step 78 that j is at least 1, the process returns to the Step 61. When i is 0, a decision at the Step 78 becomes "No". This means that all the words of the sentence pattern k, except the words that can be omitted, are included in the input sentence. Thus, the process goes to the processing at the Step 69 and finishes the demand identification.

If Pj is the symbol "?", the word $Pj_{-1}$ which is a word before the "?" is compared with Wj (Step 79). If these words match as a result the comparison, 1 is deducted from i (Step 81) and a matching processing of this word, that is, the processings from the Step 64 onward are carried out. If $Pj_{-1}$ is not the same as Wj, 1 is deducted from j (Step 80). If j is at least 1 (Step 82), a matching of words is carried out by using a word one before the word of the input sentence from the Step 61. If j is 0, this means that the matching with the sentence pattern k has been unsuccessful, and therefore, a matching processing with the next sentence pattern (k+1), that is, the processings from the Step 67 onward are carried out.

Next, the processing for obtaining information necessary for executing the demand, that is, the processing at the Step 52 in FIG. 6, is carried out.

Several pieces of information are necessary to execute a demand depending on the demand. As a method for controlling the obtaining of information, necessary information items and a method for obtaining these information items are prepared as data in a frame format. The data of this frame format Ks called a case frame 57. Items of information necessary for executing this demand are provided to each slot of the case frame 57.

In the example of FIG. 6, it is shown that two information items of the "system" and the "state variable" are necessary for the demand "trend". Data necessary for obtaining these information items is given to the facet and value of each slot of the case frame 57. The VALUE facet is provided with a name of a semantic category of a word to be retrieved from an input sentence and the IF-NEEDED facet is provided with a name of a function to be started when a necessary word does not exist in the input sentence. The function STACK is a function for referring to a dialog history stack and the function ASK is a function for requesting an additional input of information to the user.

The processing of the Step 52 will be explained by using FIG. 51. Each case frame 57 having the name of a demand identified in the Step 51, for example, trend, as the frame name is extracted from the memory 10 (Step 83). Next, i is set to 1 (Step 84). After this initialization, the value of the VALUE facet in the first slot is read this value is set as a value of Vi (Step 85). If the value of this Vi is not nil (Step 86), a word having the semantic category Vi is searched from the input sentence (Step 87). If a word has been found (Step 88), the word obtained is set as a value of the information item of the first slot (Step 89). If there is still a remaining slot to be processed (Step 92), 1 is added to i (Step 93) and the processings 85 afterward are executed for the next slot. If a decision has been made that a corresponding word was not found at the Step 88 or if the value of Vi is nil at the Step 86, the value of the IF-NEEDED facet is read and this value is set as the value Ni (Step 90). Next, the functions of Ni are carried out sequentially. If a value has been obtained as a result of this sequential processing, this value is set as a value of the information item of the first slot (Step 91) and the process proceeds to the processing of the next slot.

The outline of the processing of the Step 52 for the example shown in FIG. 6 will be explained. There are two slots of the "system" and the "state variable" in the case frame 57 corresponding to the demand trend. For the "system", a word of the semantic category <system> is searched from the input character string and a feedwater system is found. For the "state variable", at first a word having the semantic category <state variable> which is being given as a value of the VALUE facet is searched from the input sentence. A corresponding word, flow rate, is now included in the input sentence. Based on this, a flow rate is set as a value of the "state variable".

Last, the processing of the output of the processing demand (Step 53) is carried out. In this processing, the demand obtained by the analysis processing and the values of the information items obtained at the Step 50 are put together and these values are outputted as a processing demand. In the example of FIG. 6, a processing demand "trend (feedwater system, flow rate)" is outputted based on the result of the above analysis.

In this input analysis processing, a kind of an input demand is identified by the matching between the sentence pattern and the input sentence. By suitably preparing sentence patterns for this identification, these sentence patterns can cope with various sequences of words. For example, when "TORENDO (trend)?TEIJI (presentation)+SEYO (do) ?" is given, it is possible to identify that the demand is "trend" even if the "feedwater system" or the "flow rate" has been inputted after the "TEIJI SEYO (make presentation)". Further, obtaining of information does not depend on the sequence of a word order either. Accordingly, in this processing method, it is possible to execute an analysis and output a processing demand without depending on the sequence of character strings to be inputted. In other words, even if information has been inputted from the CRT touch input device 1 and the speech input device 3 in the order of "TORENDO (trend) HYOOJI (Display) KYUUSUIKEI (feedwater system) RYUURYOO (flow rate)." in stead of the above-mentioned order of "KYUUSUIKEI (feedwater system) RYUURYOO (flow rate) TORENDO (trend) HYOOJI (Display).", the input information analysis unit 9 can obtain a processing demand having the same meaning as "KYUUSUIKEI (feedwater system) RYUURYOO (flow rate) TORENDO (trend) HYOOJI (Display)."

Figure 10:
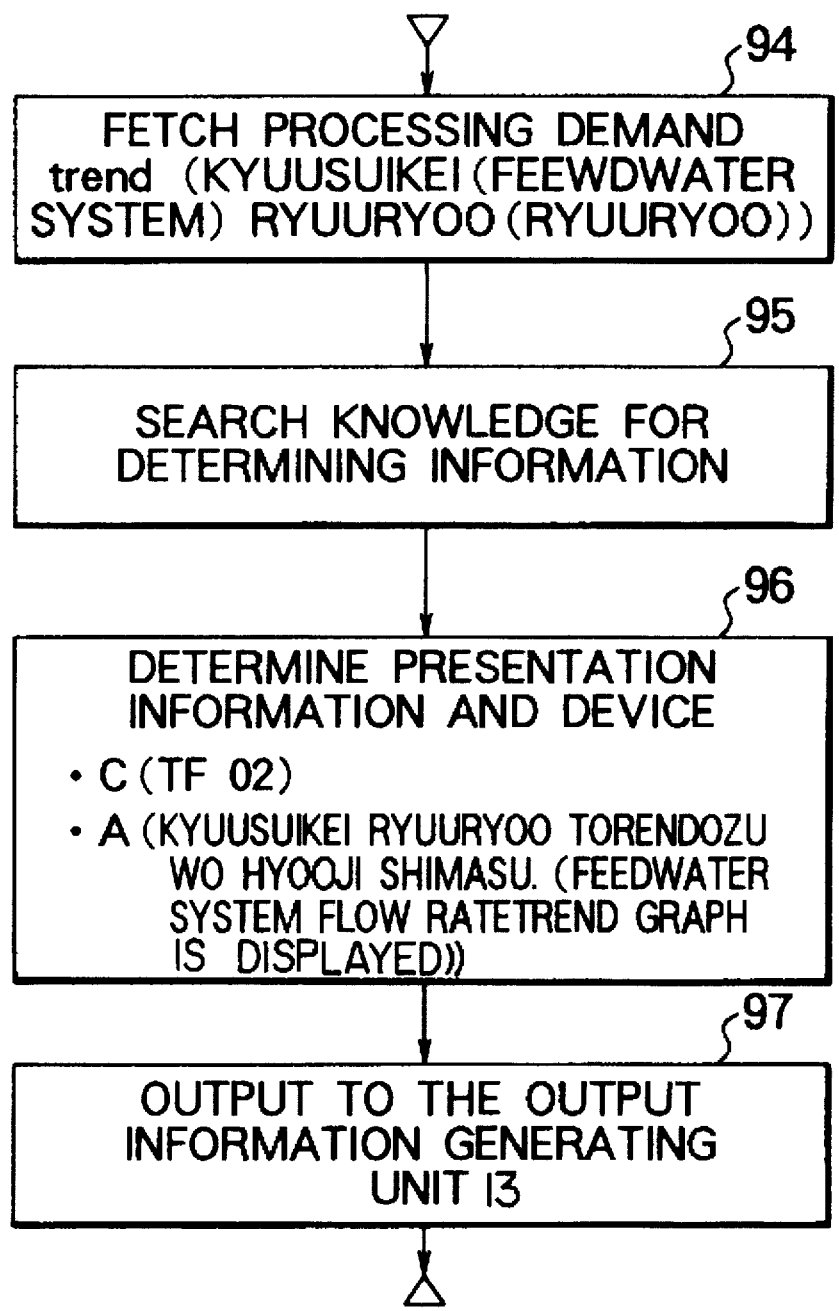
FIG. 10 is an explanatory diagram for showing a processing procedure of a process to be carried out by a presentation information determining unit shown in FIG. 1.

FIG. 10 shows details of the processing of the presentation information determining unit 11. A processing demand obtained by the analysis in the input information analyzing unit 11 is fetched (Step 94). In the example of FIG. 6, "trend (feedwater system, flow rate)" is fetched. Based on this processing demand, corresponding knowledge for determining information is retrieved from the memory 12 (Step 95). FIG. 11 shows an example of the knowledge for determining information. This example of the knowledge for determining information shows knowledge of the case where a kind of the demand processing is "trend". Although not shown, knowledge for determining information for the display of a system diagram and knowledge for determining information for the display of an alarm are also being stored in the memory 12. The knowledge for determining information is broadly divided into three kinds of "for CRT output", "for speech output", (not shown in FIG. 10) and "for display area of output character strings of speech output and CRT output", and this knowledge is collectively stored by being classified into these three items. The knowledge for determining information for the CRT output corresponds to the system name and the name of the state level and this knowledge is being provided with a number of a trend chart to be presented. The knowledge for determining information for the display area of output character strings of speech output and CRT output is provided with one common knowledge for the display demand "trend" of the trend diagram.

Next, by using the retrieved knowledge for determining information, presentation information and a device for presenting this information, at least one of the CRT display device 2 and the speech output device 4, is determined (Step 96). For the processing demand "trend (feedwater system, flow rate)", a diagram TF02 is selected as a diagram to be outputted to the CRT display device 2 by using the knowledge for determining information for the CRT output since this processing demand is the trend for the "flow rate of the feedwater system". Further, by using the knowledge for determining information for the display area of output character strings of speech output and CRT output, the "feedwater system" is inputted to the [system name] and the "flow rate" is inputted to the [state level name] to produce "KYUUSUIKEI RYUURYOO TORENDOZU WO HYOOJI SHIMASU. (Trend diagram of feedwater system flow rate is displayed.)" as information to be outputted to the speech output device 4 and information to be displayed in the output character string display area 29 of the CRT display device 2.

In outputting the presentation information which has been obtained to the output information generating unit 13, a device symbol "C" is added to the header of the presentation information to be outputted to the CRT display device 2, a device symbol "V" is added to the header of the presentation information to be outputted to the speech output device 4, and a device symbol "A" is added to the header of the presentation information to be outputted to both devices (refer to Step 96 in FIG. 10). These device symbols are automatically given according to the kind of knowledge for determining information used for determining the presentation information, that is, according to the knowledge for determining each information of "for CRT output", "for speech output", (not shown in FIG. 10) and "for display area of output character strings of speech output and CRT output". The presentation information obtained at the Step 96 is outputted to the output information generating unit 13 (Step 97). In the above example, "C (TF02)" and "A (Feedwater system flow rate trend diagram is displayed.)" are outputted to the output information generating unit 13.

Processing of the output information generating unit 13 will be explained with reference to FIGS. 12 and 13. The output information generating unit 13 starts the processing shown in FIG. 12 as soon as information relating to the presentation information has been outputted from the presentation information determining unit 11. Data on the "device and presentation information" which has been outputted from the presentation information determining unit 11 is fetched (Step 98). A decision is made of the device symbol given to the header of the inputted data. At first, a decision is made whether the device symbol is "C" or not (Step 99). If the device symbol is "C" as a result of this decision, based on the data of the presentation information, corresponding display screen data out of the display screen data of the trend diagram and the system diagram stored in the memory (not shown) of the output information generating unit 13 is retrieved and data necessary for the display is retrieved from the data stored in the plant data table 14 and the trend memory 15. The retrieved data are outputted to the CRT display device 2 as display information (Step 100).

In the above example, the display screen data of the diagram number TF03 (screen data for displaying the trend of the feedwater system flow rate) and the measured data of the feedwater system flow rate that is being stored in the trend memory 15 are outputted to the CRT display device 2. A decision is made whether there exists other device symbol or not (Step 101). If a decision has been made that there exists other device symbol, that is, a decision has been "Yes", the processings from the Step 99 afterwards are carried out. If a decision has been made as "No" at the Step 101, the processing at the output information generating unit 13 is stopped. If the decision at the Step 99 has been "No", a decision is made at Step 102 whether the device symbol is "V" or not. If the decision at the Step 102 has been "Yes" or "V", data which is necessary for notifying in speech the information assigned as presentation information is read from the plant data table 14 and the trend memory 15, and this read data is outputted to the speech output device 4 (Step 103).

Then, a decision is made whether there is other device symbol or not (Step 104). If a decision has been made as "Yes" at the Step 104, the processings from the Step 99 afterward are executed. If a decision has been made as "No" at the Step 104, the processing at the output information generating unit 13 is stopped. If the decision at the Step 102 has been "No", a decision is made at the Step 105 whether the device symbol is "A" or not (Step 105). If the device symbol is "A", the output character string information "KYUUSUIKEI RYUURYOO TORENDO WO HYOOJI SHIMASU". (Feedwater system flow rate trend diagram is displayed.) is outputted to the CRT display device 2 to make a display in the output character string display area 29 of the CRT display device 2, and at the same time this output character string information is outputted to the speech output device 4 (Step 106).

By the processings as explained for the above example, for the "KYUUSUIKEI (feedwater system) RYUURYOO (flow rate) TORENDO (trend) HYOOJI (display)", a trend of the feedwater system flow rate is displayed in the trend diagram display area 26 and the output character string information is displayed in the output character string display area 29 , as shown in FIG. 2. The output character string displayed in the output character string display area 29 is an answer t6 the input character string information displayed in the input character string display area 28.

Display screen data of a corresponding system diagram displayed in the system diagram display area 25 shown in FIG. 2 and data for showing the state of a device included in this system diagram, such as, for example, the operation states and the open and close states of the feedwater pumps and valves, etc., are similarly produced by this output information generating unit 13. Alarm information relating to the displayed system to be displayed in the message display area 27 is also produced by the output information generating unit 13 in a similar manner.

Other processing at the output information generating unit 13 based on the procedure of FIG. 13 will be explained. The processing procedure shown in FIG. 13 is carried out periodically and this processing procedure is carried out by an interruption time sharing processing when the processing of FIG. 12 is being carried out. At Step 107, the character string stored in the memory 8 is fetched and a decision is made whether this character has changed or not. If the character string has not changed from the one at the time of the previous processing, the processing of FIG. 13 is stopped temporarily. If a decision has been made that the character string has changed since the previous processing, the information fetched at the Step 107 is outputted to the CRT display device 2 to make a display in the input character string display area 28 of the CRT display device 2 (Step 108). The processing of FIG. 13 is also stopped provisionally when the processing at the Step 108 has ended. By the processing of FIG. 13, it is possible to display in the input character string display area the character string information based on the information which has been inputted by the user.

According to the present embodiment explained above, the coordinate information inputted by a CRT touch input is converted into character string information, the information inputted by the speech input device 3 is also converted into character string information and these character string information are inputted to the input information analyzing unit 9 as one input sentence by being integrated together. Accordingly, it is possible to input from the speech input device 3 the information that has been inputted by the above-described CRT touch input and it is possible to input by a CRT touch input the information that has been inputted from this speech input device 3. Therefore, the user can input his or her desired information by freely selecting the CRT touch input device 1 and the speech input device 3 without paying attention to which information can be inputted by the CRT touch input device 1 and which information can be inputted by the speech input device 3.

Accordingly, the present embodiment enables the user to input demand of various kinds of display information instructions by freely combining the CRT touch input and the speech input without limiting input information to any one of these. This method substantially reduces the load of the user in inputting information.

Further, since the input information by the CRT touch input and the speech input can be converted into the same kind of information, that is, character string information, and these information are integrated and analyzed by the input information analyzing unit 9, it is possible to analyze the meaning of the input information without discriminating the input information by the CRT touch input and by the speech input. Particularly, since the input information is inputted as character string information to the input information analyzing unit 9, it facilitates syntactics analysis and it also facilitates the analysis of the meaning of the information.

By the CRT touch input, information can be inputted immediately but information not being displayed on the screen can not be inputted. On the other hand, information not being displayed on the screen can also be inputted by the speech input. However, the speech input takes a longer time for inputting information. According to the present embodiment, it is possible to input information by freely selecting an input unit which has higher efficiency of inputting information by taking into consideration the advantages and disadvantages of the CRT touch input and the speech input.

Since the input character string display area 28 is provided, the user can confirm the information he has inputted by looking at the information displayed in this display area. Therefore, if the user has inputted wrong information, he can correct the information immediately. The input of correct information can be done either by the CRT touch input or the speech input. Accordingly, when the user has made an erroneous confirmation of a speech word by an input by the speech input device 3 or when he has made an erroneous touch of the CRT, a suitable input of information can be progressed smoothly.

Since an answer to the input character string information displayed in the input character string display area 28 is displayed in the output character string display area 29, the user can confirm whether a suitable processing has been carried out for the inputted information by looking at the information displayed in the output character string display area 29, as described above.

Further, since the knowledge for determining information is being used, by correcting this knowledge, it is possible to easily correct the content of information to be displayed and information to be notified in speech. Also, in the case of newly adding an information output device, it is possible to output information to the new information output device with ease by simply correcting the information determining knowledge.

According to the present embodiment, an information output device can be automatically selected based on the knowledge for determining information to be used and output information is provided to this device. Therefore, it is possible to reduce the load of the user in confirming the plant state, etc. Further, since the CRT display device and the speech output device are used for the output device, it is possible to provide information in a presentation format which is easy to understand, depending on the contents of information.

Further, both speech input information and CRT touch input information are stored as a character string which can be analyzed in the same manner and these information are integrated to carry out an input analysis. Accordingly, the input information analyzing unit 11 can be in a simple structure which uses one analyzing method.

Further, it is possible to handle the CRT touch input and the speech input as the character string of the same kind and to analyze these inputs by integrating these inputs in a desired sequence. With this arrangement, it is possible to use the CRT touch input and the speech input by a free combination of these inputs for making an input, without requiring a consideration of the sequence of these inputs. It is also possible to freely set the sequence of storing character strings and a memory method within the device.

Further, the CRT touch input coordinates are converted into a character string by using a relationship between the coordinates and the character string prepared in advance for each display diagram and the information relating to a display diagram under the display. With this arrangement, it is easy to add a display diagram by adding a relationship and it is easy to adjust a display diagram by correcting the relationship between the corresponding coordinates and the character string.

The display screen is divided into an area which changes according to the user input and a fixed area which does not change, and a character string input menu for control such as "OK" and others which are used in high frequency are disposed in the fixed area. With this arrangement, the user can remember the menu position and can touch these positions quickly.

The structure of the present embodiment can be applied not only to the monitoring of the information of a nuclear power plant, a thermal power plant, a chemical plant, water works, etc. but also to the monitoring of the information of an information network system, an airplane, a ship, etc.

Another embodiment of the present information will be explained below. The present embodiment is a control apparatus. The present embodiment will be explained below with reference to FIG. 14 by taking a plant control apparatus as an example of the control apparatus. Parts or blocks which are the same as those of the above-described embodiment are attached with the same symbols.

The plant control apparatus of the present embodiment has an information input device including a mouse input device 110, a speech input device 3, a mouse input processing unit 111, an input control unit 7, an input information analyzing unit 9, memories 6, 8 and 10, and a speech information converting unit 33. This information input device can also be replaced with the information input device of the first embodiment shown in FIG. 1. Information stored in the memories 6, 8 and 10 is the same kind of information used in the embodiment of FIG. 1. The plant control apparatus of the present embodiment further includes a presentation information determining unit 11A, a memory 12, an output information generating unit 13, a large screen display device 2A, a speech output device 4, an operation control unit 113 and a memory 114. The memory 114 stores knowledge for operating the system. A plant data table 14, a trend memory 15 and a plant information management unit 16 are also provided.

Processing of each unit will be explained below.

Processing of the mouse input processing unit will be explained below with reference to FIG. 15. By the operation of a mouse (not shown), coordinates (x, y) assigned on the screen of the large screen display device 2A is fetched from the mouse input device 110 (Step 115). Next, the name of the diagram currently being displayed, such as for example, the name of the system, is fetched from the output information generating unit 13 (Step 116). Next, the above assigned coordinates are converted to corresponding character string information by using the relationship between the coordinates and the character string in the knowledge for converting the coordinates into a character string which is being stored in the memory 6 (refer to FIG. 16) (Step 117). The character string information obtained is outputted to the input control unit 7 (Step 118).

Detailed contents of an example of the knowledge for converting the coordinates into a character string is shown in FIG. 16. This knowledge for converting the coordinates into a character string is the same as the one shown in FIG. 3. The knowledge for converting the coordinates into a character string includes knowledge by display diagram and common knowledge. Each knowledge is being provided with x coordinates XL and y coordinates YL of a left upper point, x coordinates XR and y coordinates YR of a right lower point and a character string in the case where input coordinates enter the square area assigned by these coordinates. By using this knowledge, a name of the fetched diagram currently being displayed and a character string corresponding to the assigned coordinates can be determined. Although a square area is being defined by the coordinates of the left upper point and the right lower point in the present embodiment, it is also possible to employ a method for defining a desired square by giving coordinates of four vertexes or for defining a circular area by giving a center point and coordinates.

Figure 15:
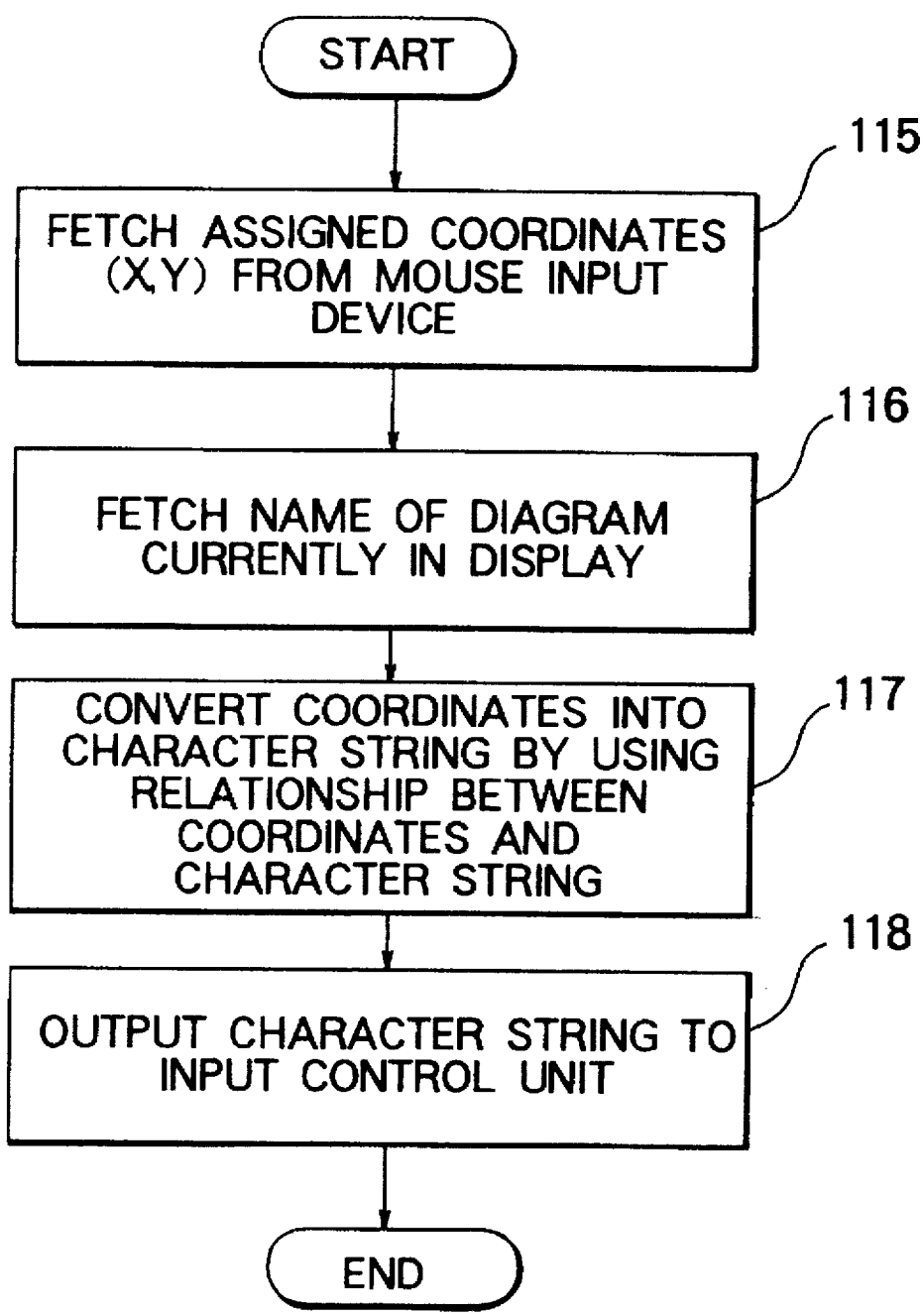
FIG. 15 is an explanatory diagram for showing a processing procedure of a process to be carried out by a mouse input processing unit shown in FIG. 14.
Figure 17:
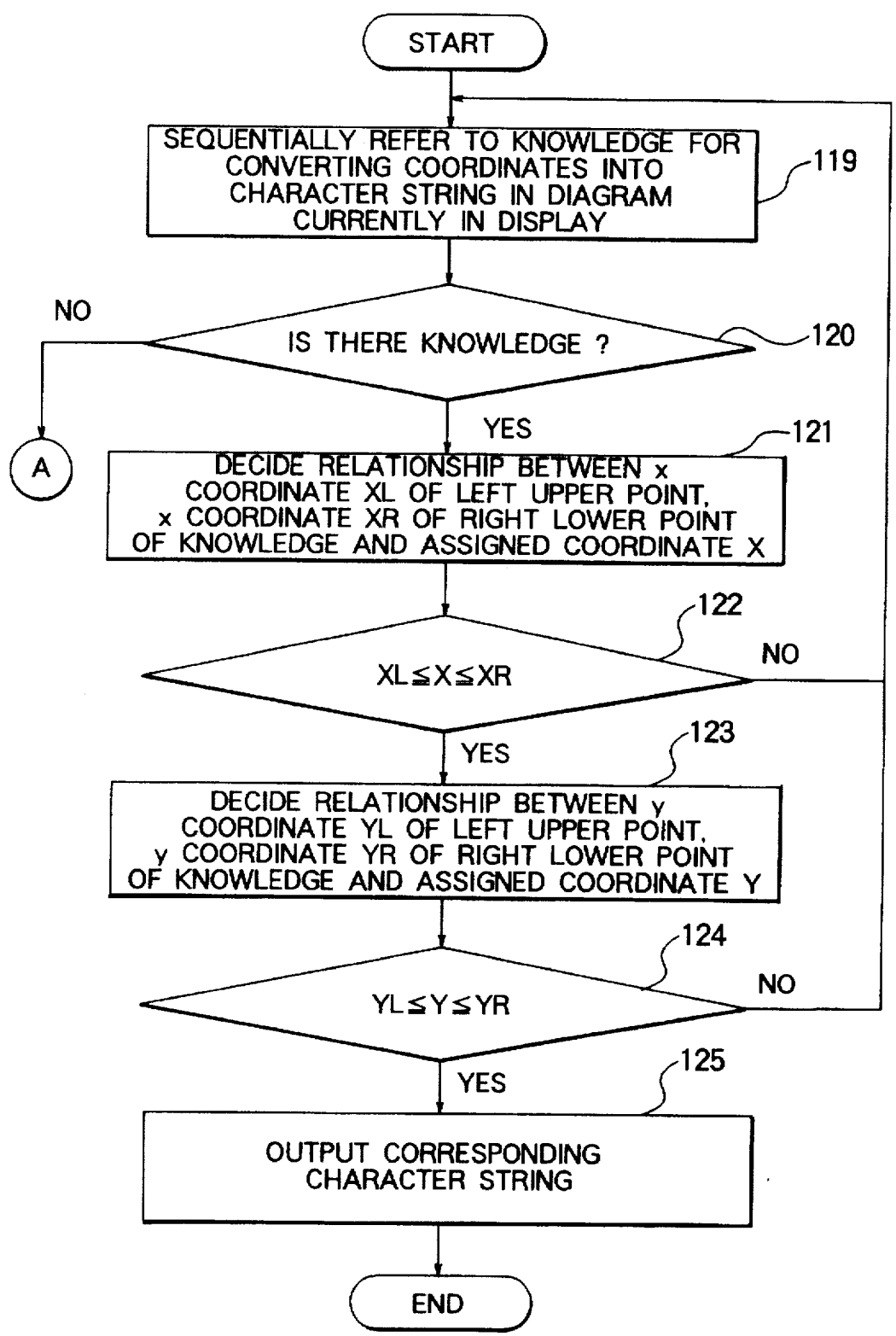
FIG. 17 is an explanatory diagram for showing a detailed processing procedure of Step 117 in FIG. 15.
Figure 18:
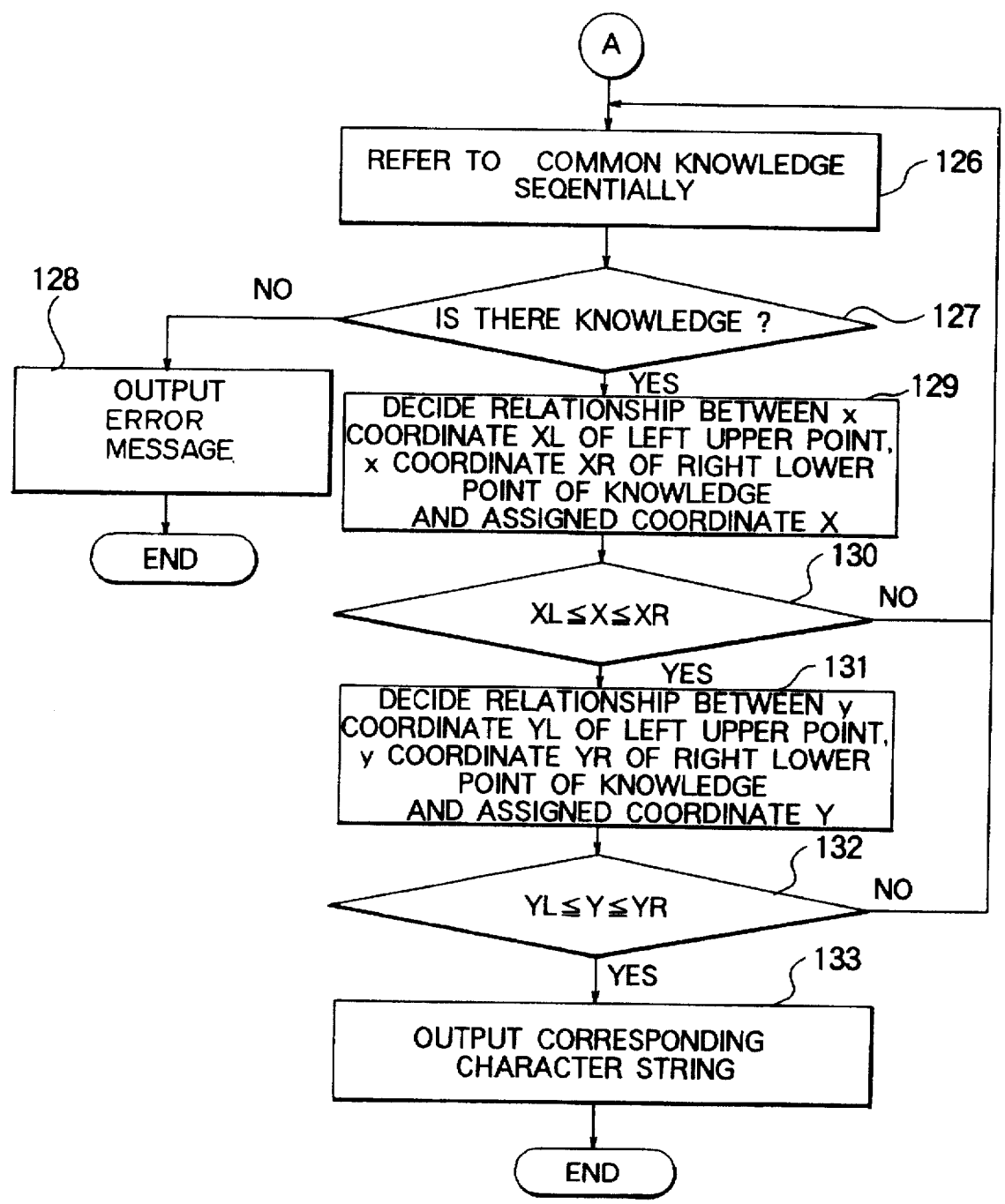
FIG. 18 is an explanatory diagram for showing a detailed processing procedure of Step 117 in FIG. 15.

FIGS. 17 and 18 show details of the processing of the Step 117 in FIG. 15. The knowledge for converting the coordinates into a character string corresponding to the display diagram is referred to in order (Step 119). A check is made to see whether there remains a knowledge or not (Step 120), and if there remains no knowledge, the process proceeds to Step 126. If a decision has been made at the Step 120 that "There is knowledge.", a decision is made of the relationship between the x coordinate XL of the left upper point, the x coordinate XR of the right lower point and the assigned coordinate X (Step 121). As a result of this decision, if $$XL \leq X \leq XR$$

does not work (Step 122), the processing returns to the Step 119. On the other hand, if this relationship has been established, a decision is made of the relationship between the y coordinate YL of the left upper point, the y coordinate YR of the right lower point and the assigned coordinate Y (Step 123). As a result of this decision, if $$YL \leq Y \leq YR$$

does not work (Step 124), the processing returns to the Step 119. Then a similar processing is carried out for the next knowledge item. On the other hand, if the relationship of the Step 124 has been established, the corresponding character information given to this knowledge is outputted to the input control unit 7 (Step 124).

The above-described Step 126 is carried out when there is no more knowledge for the displayed diagram, and the common knowledge is referred to sequentially. Then, a decision is made whether there exists a corresponding knowledge or not (Step 127). If there is no corresponding knowledge, an error message is produced to the effect that the assignment by the mouse was invalid (Step 128). If there exists a corresponding knowledge, each processing at Steps 129 to 133 is carried out. Each of the processings at Steps 129 to 133 is the same as that of the Steps 121 to 125.

Figure 19:
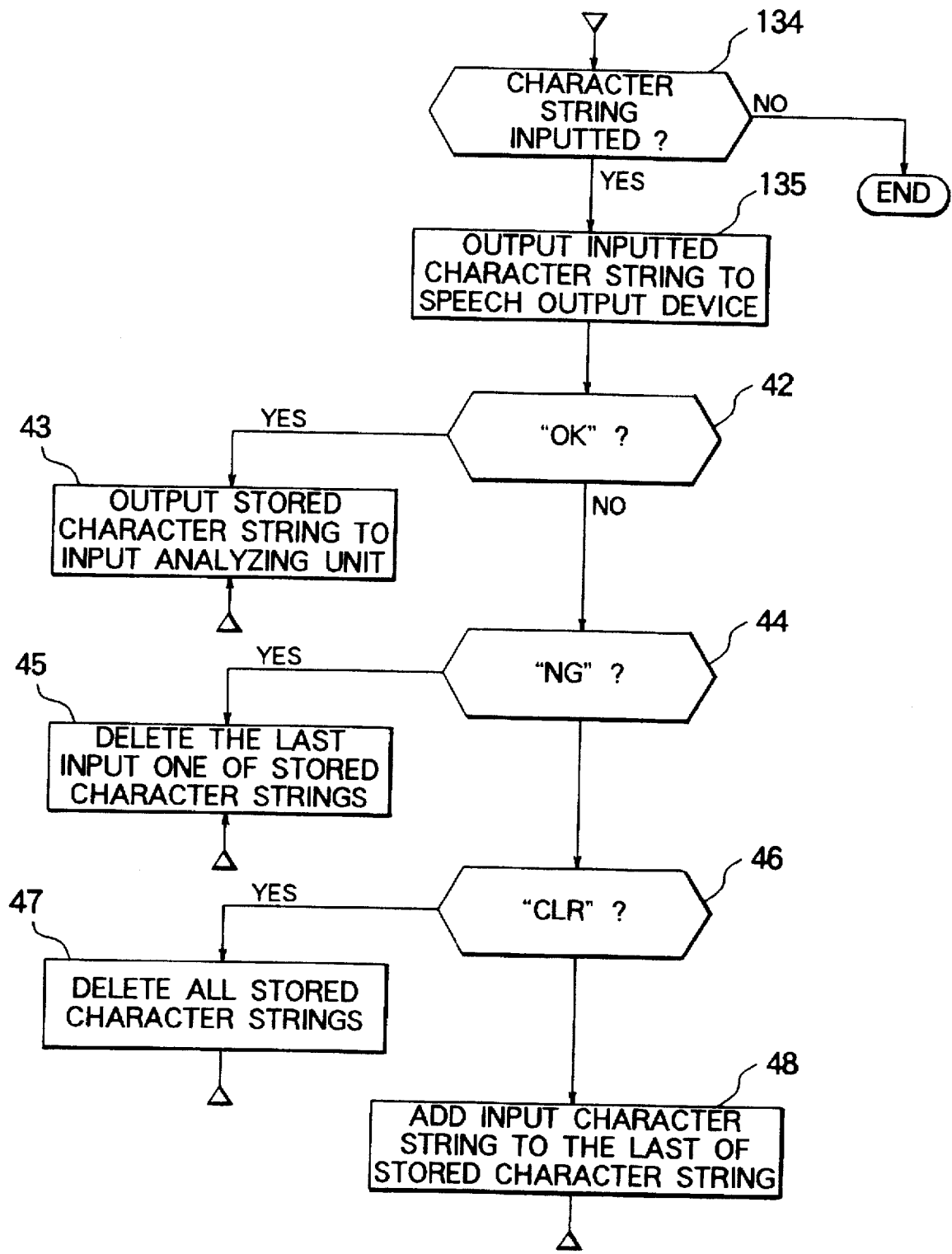
FIG. 19 is an explanatory diagram for showing a processing procedure of a process to be carried out by an input control unit shown in FIG. 14.

The processings at the input control unit 7 will be explained with reference to FIG. 19. The processings at the Steps 42 to 48 are the same as the processings of the same reference numbers shown in FIG. 5. The processings at the Steps 134 and 135 are carried out before the Step 42. At the Step 134, a decision is made whether character string information outputted from the mouse input processing unit 111 and the speech information converting unit 33 have been fetched or not. If character string information has been fetched, this character string information is outputted to the speech output device 4 (Step 135). Then, the processings at the Steps 42 to 48 are carried out.

Figure 14:
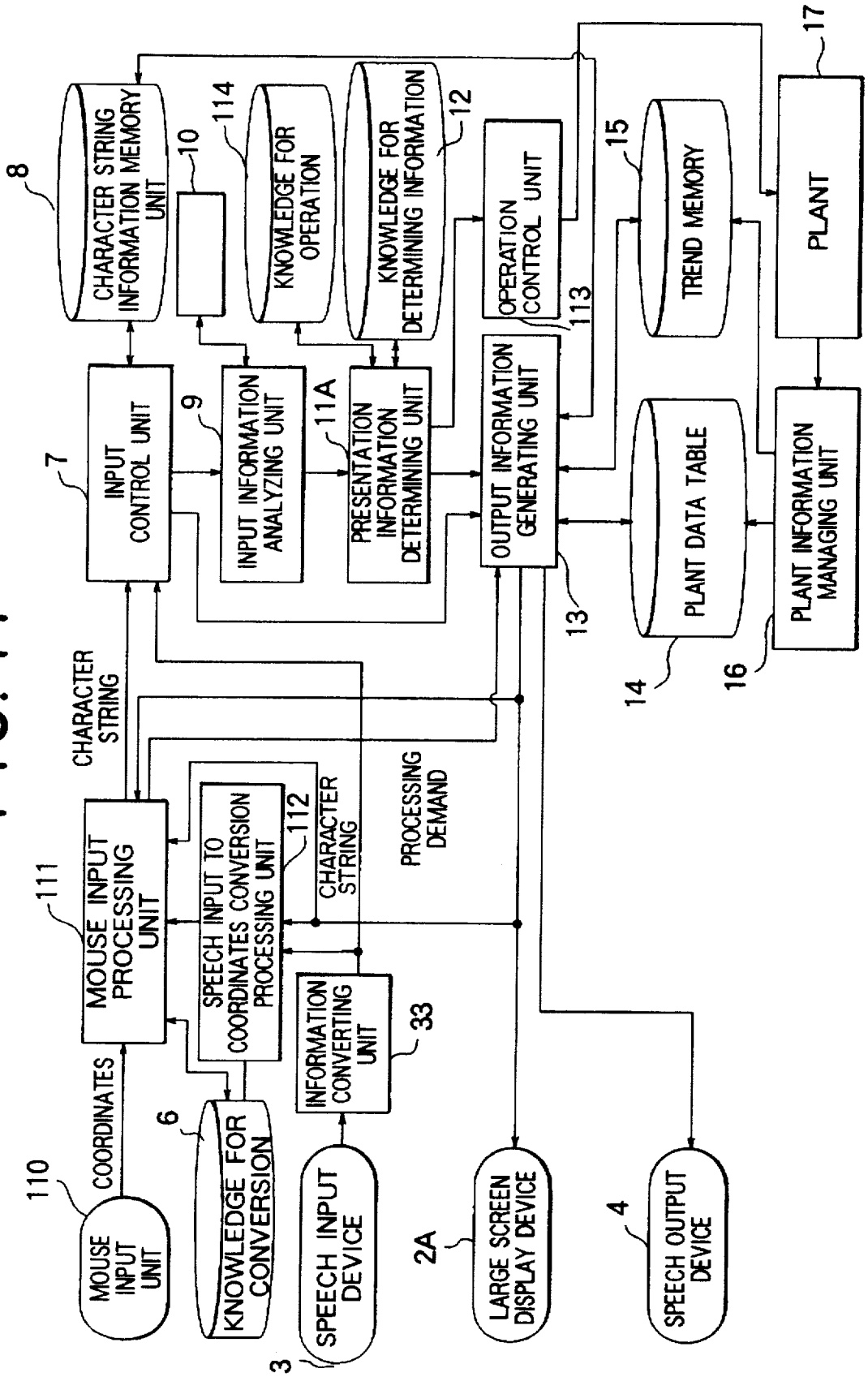
FIG. 14 is a configuration diagram of the plant monitoring apparatus according to another embodiment of the present invention.

The input information analyzing unit 9 in FIG. 14 inputs character string information from the memory 8, analyses the character string information in the same manner as the input information analyzing unit 9 in FIG. 1, and outputs a processing demand obtained. This processing demand is inputted to the presentation information determining unit 11A.

Based on the above processing demand, the presentation information determining unit 11A determines presentation information for display to be outputted to the output information generating unit 13 and presentation information for operation to be outputted to the operation control unit 113. The presentation information for display is obtained by the processing according to the processing order shown in FIG. 10 which is executed by the presentation information determining unit 11 shown in FIG. 1.

Next, the processing for obtaining the presentation information for operation by the presentation information determining unit 11A will be explained.

An example of the knowledge to be used for obtaining the presentation information for operation is shown in FIG. 20.

The knowledge for operation includes names of systems, types of operation, and corresponding names of variables and set values. For example, in order to set open an injection valve of a high pressure core spray system of a boiling water type reactor, a demand for setting the value of a variable DI (1) to "1" is transmitted to the operation control unit 113. When this value has been set, the operation control unit 113 outputs a demand for opening the injection valve of the high pressure core spray system to the corresponding injection valve which is one of the plant operation units.

Figure 21:
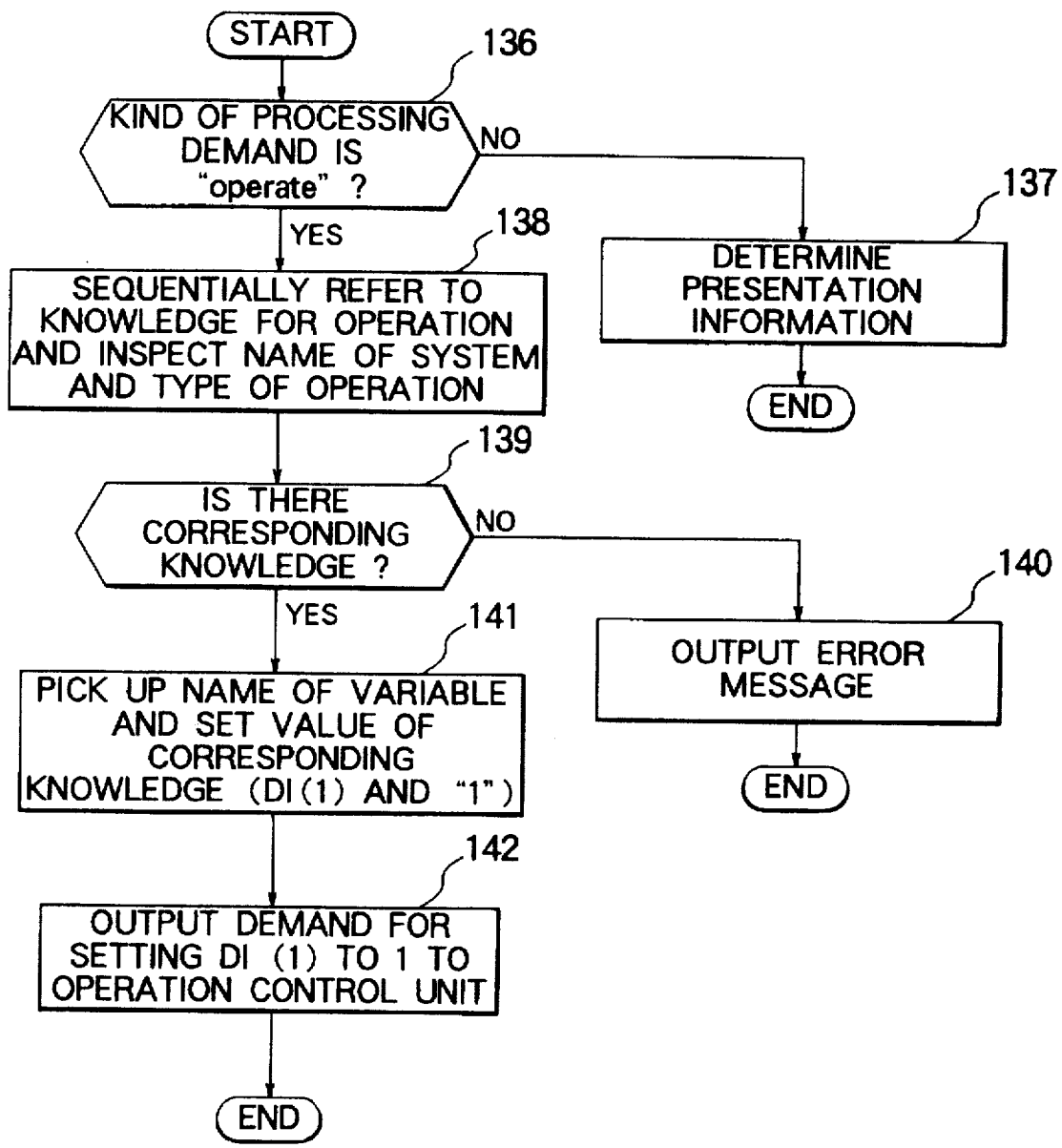
FIG. 21 is an explanatory diagram for showing a processing procedure of a process to be carried out by a presentation information determining unit shown in FIG. 14.

FIG. 21 shows a sequence for obtaining the presentation information for operation which is executed by the presentation information determining unit 11A shown in FIG. 14. The presentation information determining unit 11A first fetches the processing demand outputted from the input information analyzing unit 9 and makes a decision whether the kind of this processing demand is "operate" which relates to the operation or not (Step 136). If a decision of "No" has been made at the Step 136, that is the kind of the processing demand is different from the "operate", the processing for obtaining the presentation information for display is carried out (Step 137). The processing at the Step 137 is the processing according to the processing sequence shown in FIG. 10. The processing demand "operate" is obtained by the input information analyzing unit 9. Although not shown in FIG. 7, a "demand: operate" and a sentence pattern corresponding to this demand are prepared as a part of the demand identification rule 56. For the inputted character string information, the input information analyzing unit 9 carries out a processing similar to the one of the embodiment as shown in FIG. 1 and outputs the processing demand "operate" by using the demand identification rule 56. On the other hand, if a decision of "Yes" has been made at the Step 136, that is the kind of the processing demand is the "operate", the knowledge for operation is referred to sequentially to search a knowledge in which the name of system and a kind of operation coincide with the above processing demand (Step 138). Then, a decision is made whether a corresponding knowledge exists or not (Step 139). If a decision of "No" has been made at the Step 139, an error message is outputted to the effect that the operation based on the inputted processing demand is impossible (Step 140). On the other hand, if there exists corresponding knowledge, the decision at the Step 139 becomes "Yes" and the name of the variable and the set value of this knowledge are fetched (Step 141). Now consider the case where operate (high pressure core spray system injection valve, open)

has been inputted as a processing demand from the input information analyzing unit 9. In this case, a name of the variable DI (1) and a set value "1" are obtained. Then, the name of the variable and the set value are outputted to the operation control unit 113 (Step 142). In the case of the above high pressure core spray system injection valve, a demand that the DI (1) should be set to "1" is outputted. Accordingly, a demand for opening the injection valve of the high pressure core spray system of the plant is outputted from the operation control unit 113.

Based on this opening demand, the injection valve of the high pressure core& spray system of the plant is opened. The plant information management unit 16 periodically monitors the changes of the plant state, and, if there occurs a change such as an opening of the injection valve, stores information relating to this change in the plant data table 14.

Figure 12:
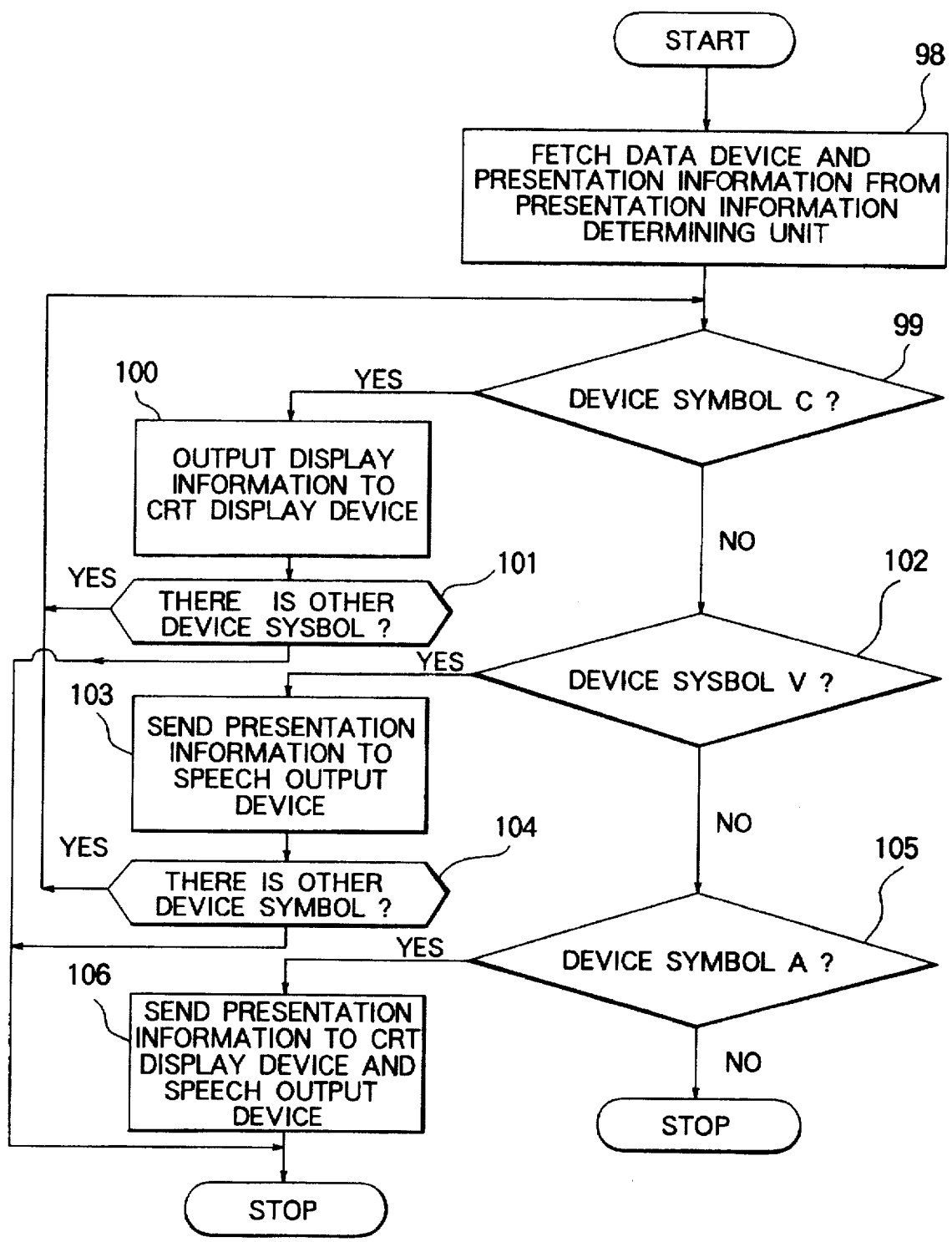
FIG. 12 is an explanatory diagram for showing a processing procedure of a process to be carried out by an output information generating unit shown in FIG. 1.
Figure 13:
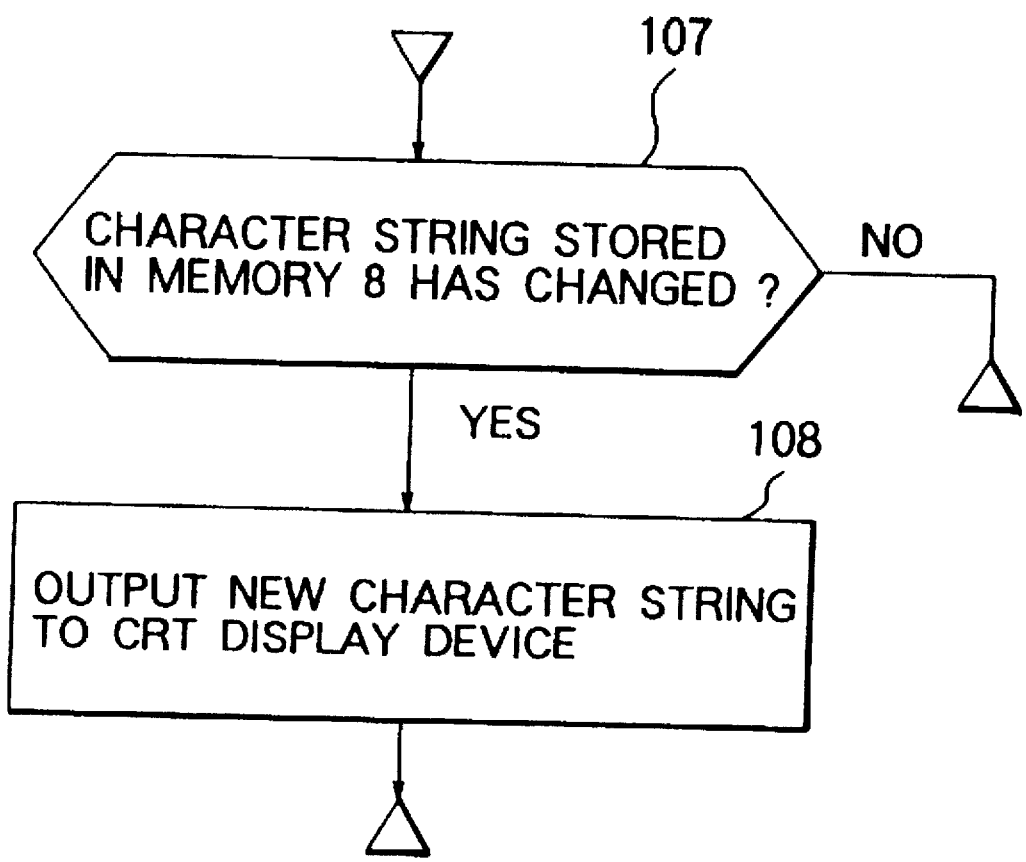
FIG. 13 is an explanatory diagram for showing a processing procedure of a process to be carried out by an output information generating unit shown in FIG. 1.

The output information generating unit 13 for inputting the presentation information for display executes the processing based on the processing sequence shown in FIGS. 12 and 13 as described in the embodiment shown in FIG. 1. In the present embodiment, the "CRT display device" shown in FIGS. 12 and 13 is replaced with the "large screen display device". Accordingly, the output information generating unit 13 outputs each of the corresponding information to the large screen display device 2A and the speech output device 4 in a manner similar to the one of the embodiment shown in FIG. 1.

FIG. 22 shows an operation progress state of the unit operation and changes in the display screen of the large screen display device 2A in this operation. In the system diagram of the plant shown in a of FIG. 22, information that has been inputted from at least one of the mouse input device 110 and the speech input device 3 is changed into character string information as described before and this information is inputted to the input control unit 7. This information is then outputted to the large screen display device 2A and displayed on the large screen by the processings of the input information analyzing unit 9, the presentation information determining unit 11A and the output information generating unit 13, as described in the embodiment of FIG. 1. In FIGS. 22, 143 designates a graphical element for showing a pump (a feedwater pump) A. The example of FIG. 22 shows an ON operation of the pump A. At first, the user clicks the pump A with the mouse or announces "pump A" in voice. This information is inputted from the mouse input device 110 and the speech input device 3 and is then converted to character string information, and the character string information "pump A" is stored in the memory 8. By the processing of the output information generating unit 13 shown in FIG. 13, the character string information "pump A" is displayed in the input character string area 28 of the large screen display device 2A. In this case, a color change demand of the graphical element 143 is transmitted from the mouse input processing unit 111 to the output information generating unit 13. By the processing of the output information generating unit 13, graphical information is produced in which the color of the graphical element 143 of the pump A has been changed and this information is outputted to the large screen display device 2A. As a result, the color of the graphical element 143 changes and the user can know that the pump A has been selected. In the case of the mouse input, character string information is obtained from the assigned coordinates as described above. In the case of the speech input, the character string information "pump A" obtained by the speech information converting unit 33 is stored in the memory 8 and is displayed in the input character string display area 28. At the same time, the character string information "pump A" is converted into coordinates by the speech coordinate converting unit 112, and the mouse-assigned processing, that is the color change of the graphical element 143, is carried out by using these coordinates.

Further, as the processing of the case where the coordinates of the pump A have been assigned with the mouse, display information of the operation menu is prepared in the mouse input processing unit 111. The display information of this operation menu is transmitted to the output information generating unit 13, and the operation menus 144 and 145 are displayed in the large screen display device 2A in either case of the mouse input and the speech input (refer to b of FIG. 22).

Next, when the operation menu 144 is clicked with the mouse or when "ON" is inputted in voice, the operation menu 144 remains and the operation menu 145 that has not been assigned is deleted and, at the same time, the character string information "pump A ON" stored in the memory 8 is displayed in the input character string display area 28. In this case, the display information of other operation menu stored in the mouse input processing unit 111 is transmitted to the output information generating unit 13 so that the "operation" and "cancel" of the operation menus 146 and 147 are displayed on the large screen display device 2A in either case of the mouse input and the speech input (refer to c of FIG. 22). In this case, when the "operation" is clicked with the mouse or when the "operation OK" is inputted in voice, the character string information "pump A ON operation." is displayed in the input character string display area 28 in the same manner. Further, the character string information "pump A ON operation." is stored in the memory 8 and this is analyzed by the input information analyzing unit 9. If the character string information of the "operation" or the "cancel" has been inputted to the input information analyzing unit 9, the input information analyzing unit 9 outputs the processing demand "operate". The presentation information determining unit 11A which has inputted the processing demand of the "pump A ON operation." outputs corresponding presentation information for operation to the operation control unit 113. The operation control unit 113 executes the ON operation of the pump A based on the presentation information for operation. The character string information outputted from the mouse input processing unit 111 based on the assigned coordinates by clicking the "operation" with the mouse is the "operation OK", which is a result quite different from the result obtained based on the speech input. The "o" which corresponds to the period in English used in the Japanese character string information is added to the last of the Japanese character string information that is being stored when the "OK" has been inputted.

When the pump A has started, the change of the signal measured in the plant 17 is detected by the plant information management unit 16 and is stored in the plant data table 14. Based on the processing of FIG. 12 by using this data, the output information generating unit 13 produces the output message "pump A operation" to be displayed in the output character string display area 29 of the large screen display device 2A and at the same time produces the display information of the flow rate "102T/h" of the pump A. These information are displayed in the large screen display device as shown in d of FIG. 22.

According to the above-described present embodiment, it is possible to obtain the same effect as obtained by the embodiment of FIG. 1. Particularly, according to the present embodiment, both the mouse input information and the speech input information are put in character string information and these information can be analyzed by being integrated together. Therefore, the user can freely input the information presentation demand and the operation demand relating to the control by freely combining these information without any limit of input items between mouse input and the speech input. Further, according to the present embodiment, the above-described effect obtained in the embodiment of FIG. 1 can be similarly obtained not only for the information presentation demand but also for the operation demand. It should be noted that although the CRT touch input has been used in the embodiment of FIG. 1 and the mouse input has been used in the embodiment of FIG. 14, it is also possible to obtain the same effect as that obtained in the embodiments of FIG. 1 and FIG. 14 when various kinds of pointing devices capable of assigning coordinates on the display screen, such as a tracker ball and a joystick, for example, are used instead of the CRT touch and mouse inputs. The same effect can also be obtained when other character string information input unit such as a keyboard is used instead of the speech input.

According to the present embodiment, the input information analyzing unit 9 analyses whether the inputted character string information is an information presentation demand and an operation demand, and outputs a corresponding processing demand, that is, at least one of the information presentation demand to the user and the operation demand of units, etc. Therefore, the analysis mechanism becomes a simple one. According to the present embodiment, it is not necessary to provide separate units of the input information analyzing the 9 for analyzing the character string information of the information presentation demand and the input information analyzing unit 9 for analyzing the character string information of the operation demand. It is not necessary to provide separate units for the presentation information determining unit 11A either.

It should also be noted that although the large screen display device has been used as a display device in the present embodiment, a similar effect can also be obtained when a device such as a plasma display, an electroluminescence display or a liquid crystal display is used or when these devices are used in combination.

According to the present embodiment, it is possible to output in voice the character string information that has been inputted and recognized by the apparatus. With this arrangement, character string information that has been recognized by the apparatus can be confirmed easily even when the user is not watching on the display screen.

According to the present embodiment, the mouse input and the speech input are handled as character string information of a natural language which the user can understand easily. Accordingly, this facilitates the user's confirmation work either in speech or on the display screen.

According to the present embodiment, the user's input information is outputted as different kinds of demand to the output information generating unit 13 and the operation control unit 113. By a similar method, it is also possible to convert the user's input information to a processing demand or data to more kinds of devices and programs.

Further, according to the present embodiment, the assigned coordinates are converted into character string information of which meaning does not change and then they are processed even in the display diagram displayed on the display device has changed. Accordingly, it is possible to store the inputted information in the form of character string information in the memory 8 until the processing within the plant control device has been completed, without any troublesome processing of storing a display diagram once displayed in the past. Further, according to the present embodiment, words of a natural language are used as character string information, and therefore, monitoring of this information in speech and on the screen can be facilitated.

According to the present embodiment, character string information based on the speech input is converted into coordinates and a processing is carried out which is similar to the one when these coordinates are inputted as assigned coordinates. With this arrangement, it is possible to use the speech and mouse inputs without discriminating these inputs including a display of the operation menu. Further, character string information based on the speech input is converted into coordinates and they are processed in the manner common to the input made by the mouse input. Therefore, it is not necessary to prepare separate processing functions relating to a menu display, etc. for the speech input, to thereby simplify the system. In converting the character string information by the speech input into coordinates, the present embodiment has prepared in advance a relationship between the coordinates and the character string information for each display diagram. This arrangement facilitates the correction of data when the display diagram has been changed or when there has been an addition to the display diagram. Further, common data are used by the mouse input processing unit and the speech to coordinates converting unit, and this facilitates the preparation and management of data.

Further, according to the present embodiment, the plant information management unit 16 periodically fetches measured signals of the plant 17 and produces new output information according to the change of the fetched signal and provides this output information to the user. Output information in response to a user's enquiry can also be produced by the output information generating unit 13. Accordingly, suitable information which reflects the plant state change and the user's enquiry can be provided to the user. With this arrangement, the user can efficiently monitor the state of the plant and operate the plant based on the result of this monitoring.

The structure of the control apparatus of the present embodiment can be applied not only to the monitoring of the information of a nuclear power station, a thermal power station, a chemical plant, water works, etc. but also to the control units of an information network system, an airplane, a vessel, etc.

An information processing apparatus according to another embodiment of the present invention will be explained with reference to FIG. 23.

The information processing apparatus of the present embodiment has an information input device which includes a liquid crystal touch input device 1A, a speech input device 3, a touch input processing unit 5, an input information processing unit 148, a speech information converting unit 33 and memories 6 and 149. This information processing apparatus also includes output information generating units 13A and 13B, a liquid crystal display device 2B and a speech output device 4. The liquid crystal touch input device 1A and the liquid crystal display device 2B are formed in an integrated structure.

The operation of the present embodiment will be explained below.

The touch input processing unit 5 converts assigned coordinates by a touch input into character string information by a processing similar to the one of the touch input processing unit 5 or the mouse input processing unit 111 in the embodiment shown in FIG. 1 or the embodiment shown in FIG. 14 by using the knowledge for converting coordinates into character string stored in the memory 6.

An example of the knowledge for converting character string information into a processing demand stored in the memory 6 is shown in FIG. 24. This knowledge is provided with a processing demand corresponding to character string information and an output destination of this processing demand for each display diagram. For example, when character string information of "feedwater pump" has been outputted to the input information processing unit 48 from the touch input processing unit 5 while the system diagram 1 is being displayed in the liquid crystal display device 2B, a processing demand "display (Menu 1)" for displaying the diagram of the "Menu 1" in the liquid display device 2B is outputted to the output information generating unit 13A.

Figure 25:
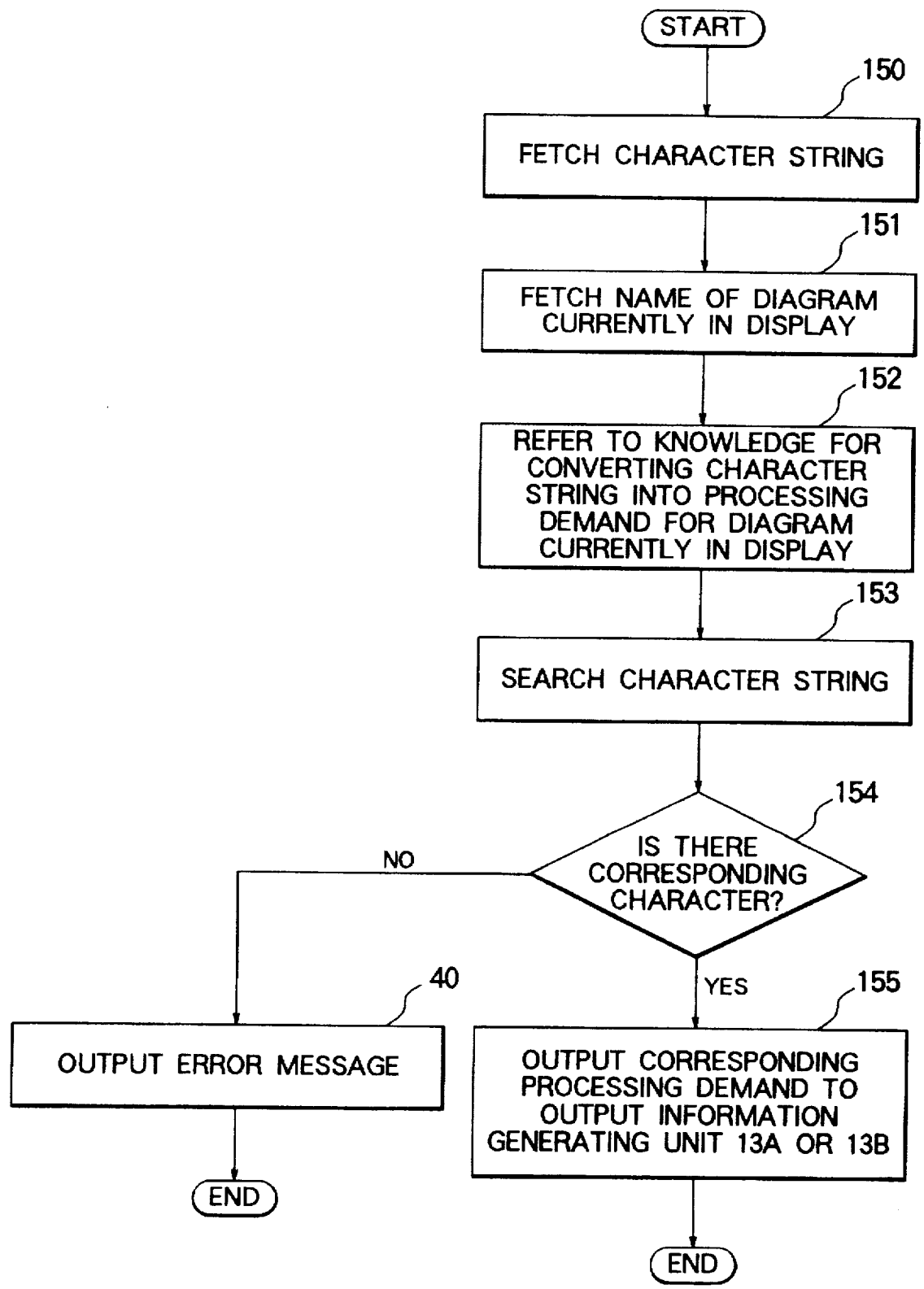
FIG. 25 is an explanatory diagram for showing a processing procedure of a process to be carried out by an input information processing unit shown in FIG. 23.

The processing sequence of the input information processing unit 148 is shown in FIG. 25. Character information outputted from at least one of the touch input processing unit 5 and the speech information converting unit 33 is fetched (Step 150). The name of the diagram displayed in the liquid crystal display device 2B is fetched (Step 151). Then, a portion relevant to the diagram under display out of the knowledge for converting character string into a processing demand within the memory 6 is referred to (Step 152). A corresponding one of the character string information that has been inputted is searched from the character string unit of the referred portion (Step 153). A decision is made whether a corresponding character string has been retrieved or not (Step 154). If a corresponding character string has been retrieved, the processing demand corresponding to this character string is outputted to the output information generating unit prescribed in the knowledge, that is, the output information generating unit 13A or 13B (Step 155). If a corresponding character string has not been retrieved, an error message is outputted to the effect "NYUURYOKU WA UKETSUKERARENAI (The input can not be accepted.)" (Step 40).

Figure 26:
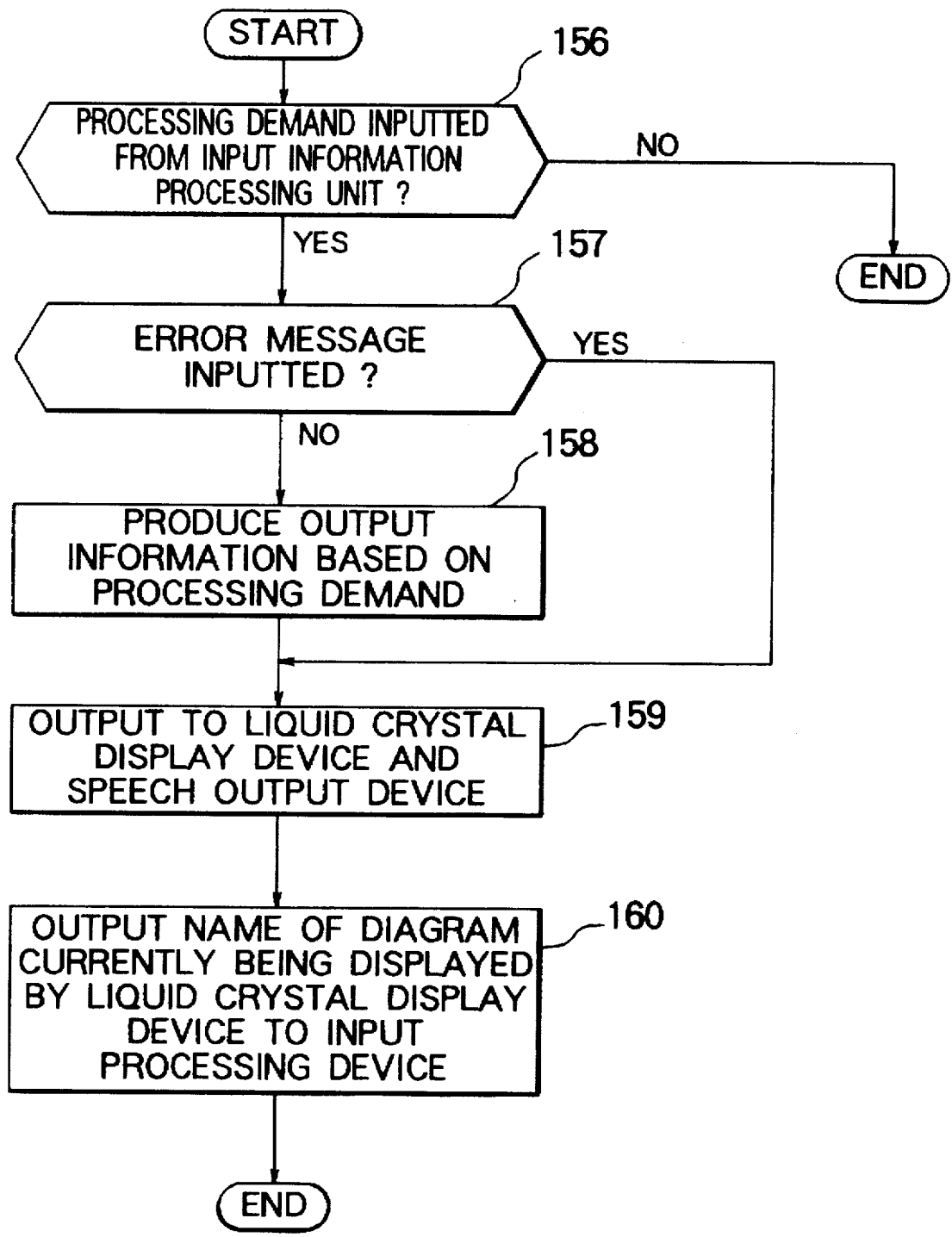
FIG. 26 is an explanatory diagram for showing a processing procedure of a process to be carried out by an output information generating unit shown in FIG. 23.

The processing carried out by the output information generating unit 13A will be explained based on FIG. 26. A decision is made whether the processing demand obtained by the input information processing unit 148 has been inputted or not (Step 156). A decision is made whether an error message has been inputted or not (Step 157). If an error message has not been inputted, the processing of Step 158 is carried out. If a processing demand has been inputted, the inputted processing demand is carried out and at least one of display information and speech information for presentation to the user corresponding to this processing demand is produced (Step 158). If a decision of the information obtained at the Step 158 or the decision at the Step 157 is "Yes", an error message is outputted to the liquid crystal display device 2B and/or the speech output device 4 (Step 159). Further, the name of the display diagram displayed by the liquid crystal display device 2B is outputted to the input information processing unit 148 (Step 160).

The output information generating unit 13B carries out a general information processing corresponding to the user input demand. The information produced by the output information generating unit 13B is also outputted to the liquid crystal display device 2B and/or the speech output device 4.

FIG. 27 schematically shows the operation of the present embodiment when the processing of the present embodiment is carried out. This example shows an operation when a revolution speed of the feedwater pump is to be outputted. 161 shows an example of an initial screen of the system diagram 1 displayed in the liquid crystal display device 2B. When the graphical element 162 (a feedwater pump) of the system diagram 1 which is being displayed is touched or when "KYUUSUI POMPU (a reactor feedwater pump)" is inputted in speech, the character string information "KYUUSUI POMPU (a reactor feedwater pump)" is fetched to the input information processing unit 148. Then, the processing demand "display (Menu 1)" is sent to the output information generating unit 13A by using the knowledge for converting the character string into a processing demand corresponding to the system diagram 1, and based on this processing demand a Menu 163 which is the menu relevant to the feedwater pump is displayed. When the user has touched a portion 164 of the revolution value or when the user has inputted "KAITEN SUUCHI (a revolution speed)" in speech, a Menu 1-1 165 which is relevant to the revolution speed of the reactor feedwater pump is displayed. Further, when the portion of "HYOOJI (display)" on the screen has been touched or when "HYOOJI (display)" is inputted in speech, a processing demand of "display-svar (KYUUSUI POMPU, KAITENSUU) (reactor feedwater pump, revolution speed)" is outputted to the output information generating unit 13B by using the knowledge for converting the character string into a processing demand. The output information generating unit 13B retrieves the revolution data of the reactor feedwater pump and outputs the revolution speed of the reactor feedwater pump to the liquid crystal display device 2B and/or the speech output device 4.

In the preset example, "KYUUSUI POMPU (a reactor feedwater pump)" has been inputted in speech. However, it is also possible to use the output character string information as "KYUUSUI POMPU (a reactor feedwater pump)" when a speech of "FW POMPU (FW pump)" has been inputted in the speech input device 3. With this arrangement, a processing similar to the above-described processing can be carried out when "FW POMPU (FW pump)" has been inputted in speech.

In the explanation of the present embodiment, a character string of a natural language has been used as character string information to facilitate the explanation. However, it is also possible to convert a voice into a general character string, such as for example, "¥POA" or "001001" in the speech input device 3 and to convert coordinates into a similar character string in the touch input processing unit 5, to carry out the processing by using these character strings.

As described above, according to the present embodiment, a graphical element within the display diagram under display is specified based on a speech input or a liquid crystal touch input, and corresponding menus which have been prepared are sequentially displayed on the screen. With this arrangement, it is possible to input a demand which uses both speech and character string inputs. Further, it is possible to input information by visually confirming the kinds of input demand that can be inputted.

Further, the above processing is carried out by converting the coordinates by a touch input into a character string and by using the relationship between the character string and the processing demand which have been prepared in advance for each display diagram. With this arrangement, it is not necessary to prepare a corresponding processing demand for each of the speech input and the touch input, so that the system can be simplified. In the system of this embodiment, an input processing is carried out by sequentially displaying the menus. However, it is also possible to prepare as data, in the device, a menu of the demand which can be inputted next instead of making a display of the menu. According to this method, a demand can be inputted without frequently changing over the display diagram.

We claim:

1. An information processing apparatus using a pointing input and a speech input, comprising:

a display device;

pointing input means for inputting information by indicating said information among information displayed on said display device;

speech input means;

first information converting means for converting first information inputted by said pointing input means into first character string information;

second information converting means for converting second information inputted by said speech input means into second character string information;

information integrating means for receiving said first and second character string information from said first and second information converting means, and integrating into a character string said first and second character string information respectively corresponding to said first and second information which has been inputted until input termination information is inputted from either said pointing input means or said speech input means;

information analyzing means for syntax-analyzing said first and second character string information which has been integrated, and generating demand information based on said first and second character string information which has been syntax-analyzed; and means for preparing presentation information corresponding to said demand information, and outputting said presentation information on said display device.

2. An information processing apparatus according to claim 1, further comprising:

a memory for storing knowledge used for converting said first information into said first character string information, wherein, by using said knowledge, said first information converting means converts said first information into said first character string information.

3. An information processing apparatus using a pointing input and a speech input, comprising:

a display device;

pointing input means for inputting information by indicating said information among information displayed on said display device;

speech input means;

first information converting means for converting first information inputted by said pointing input means into first character string information;

second information converting means for converting second information inputted by said speech input means into second character string information;

a memory for receiving said first and second character string information from said first and second information converting means, and storing said first and second character string information so as to integrate into a character string said first and second character string information, said first and second character string information respectively corresponding to said first and second information which has been inputted until said input termination information is inputted;

information analyzing means for syntax-analyzing said first and second character string information stored in said memory in relation to said input termination information, and generating demand information based on said first and second input character string information which has been syntax-analyzed; and presentation preparing means for preparing presentation information corresponding to said demand information, and outputting said presentation information on said display device.

4. An information processing apparatus according to claim 3, further comprising:

means for fetching character string information including said first and second character string information stored in said memory, when said character string information including said first and second character string information has changed; and means for outputting said changed character string information on said display device.

5. An information processing apparatus according to claim 3, wherein said presentation information generating means includes means for generating answer information in response to said first and second character string information which have been inputted and outputting said answer information to said display device based on said demand information.

6. An information processing apparatus using a pointing input and a speech input, comprising:
    a display device;
    speech output means;
    pointing input means for inputting information by indicating said information among information displayed on said display device;
    speech input means;
    first information converting means for converting first information inputted by said pointing input means into first character string information;
    second information converting means for converting second information inputted by said speech input means into second character string information;
    information integrating means for receiving said first and second character string information from said first and second information converting means, and integrating into a character string said first and second character string information respectively corresponding to said first and second information which has been inputted until input termination information is inputted from either said pointing input means or said speech input means;
    information analyzing means for syntax-analyzing said first and second character string information which has been integrated, and generating demand information based on said first and second character string information which has been syntax-analyzed;
    means for preparing presentation information corresponding to said demand information; and
    means for determining said display device or said speech output means in order to output said presentation information, on the basis of said demand information.

7. An information processing apparatus using a pointing input and a speech input, comprising:
    a display device;
    pointing input means for inputting information by indicating said information among information displayed on said display device;
    speech input means;
    first information converting means for converting first information inputted by said pointing input means into first character string information;
    second information converting means for converting second information inputted by said speech input means into second character string information;
    information integrating means for receiving said first and second character string information from said first and second information converting means, and integrating into a character string said first and second character string information respectively corresponding to said first and second information which have been inputted until input termination information is inputted from either said pointing input means or said speech input means;
    information analyzing means for syntax-analyzing said first and second character string information which have been integrated and generating demand information based on said first and second character string information which has been syntax-analyzed;
    means for preparing display information to be displayed on said display device when said demand information is an information display demand; and
    means for preparing control data when said demand information is an operation demand.

8. A plant monitoring apparatus using a pointing input and a speech input, comprising:
    a display device;
    pointing input means for inputting information by indicating said information among information displayed on said display device;
    speech input means;
    means for storing measurement data measured at a plant;
    first information converting means for converting first information inputted by said pointing input means into first character string information;
    second information converting means for converting second information inputted by said speech input means into second character string information;
    information integrating means for receiving said first and second character string information from said first and second information converting means, and integrating into a character string said first and second character string information respectively corresponding to said first and second information which have been inputted until input termination information is inputted from either said pointing input means or said speech input means;
    information analyzing means for syntax-analyzing said first and second character string information which have been integrated, and generating demand information based on said first and second character string information which has been syntax-analyzed; and
    means for preparing presentation information corresponding to said demand information by using said measurement data, and outputting said presentation information on said display device.

9. A plant monitoring apparatus according to claim 8, wherein said presentation information preparing means includes means for generating answer information to inputted character string information and outputting said answer information to said display device based on said demand information.

10. A plant monitoring apparatus according to claim 8, wherein
    said display device has a system diagram display area, a trend display area, an input character string display area and an answer display area; and
    said preparation means includes:
        means for outputting a system diagram including graphic elements of a plurality of components included in said plant to said display device to display said system diagram in said system diagram display area;
        means for generating trend graph display information corresponding to said demand information by using said measured data and outputting said trend graph display information to said display device to display said trend graph display information in said trend display area;
        means for outputting character string information stored in said information integrating means to said display device to display said character string information in said input character string display area when said character string information has changed; and means for generating answer information in response to inputted string information and outputting said answer information to said display device to display said answer information in said answer display area.

11. An information processing apparatus according to claim 8, further comprising:

means for fetching character string information including said first and second character string information from said information integrating means, when said character string information including said first and second character string information has changed; and means for outputting said changed character string information on said display device.

12. A plant control apparatus using a pointing input and a speech input, comprising:

a display device;

pointing input means for inputting information by indicating said information among information displayed on said display device;

speech input means;

means for storing measurement data measured at a plant;

first information converting means for converting first information inputted by said pointing input means into first character string information;

second information converting means for converting second information inputted by said speech input means into second character string information;

information integrating means for receiving said first and second character string information from said first and second information converting means, and integrating into a character string said first and second character string information respectively corresponding to said first and second information which have been inputted until input termination information is inputted from either said pointing input means or said speech input means;

information analyzing means for syntax-analyzing said first and second character string information which have been integrated, and generating demand information based on said first and second character string information which has been syntax-analyzed;

means for preparing display information to be displayed on said display device when said demand information is an information display demand; and means for preparing a control demand for a corresponding component in said plant when said demand information is an operation demand.

* * * * *